US011849708B2

(12) United States Patent
Russek et al.

(10) Patent No.: US 11,849,708 B2
(45) Date of Patent: Dec. 26, 2023

(54) SYSTEM AND METHOD FOR SHRIMP CULTIVATION

(71) Applicant: Atarraya, Inc., Lakeland, FL (US)

(72) Inventors: Daniel Russek, Lakeland, FL (US); Michel Facen, Lakeland, FL (US); Andre Freitas, Lakeland, FL (US); Victor Perez-Rul, Lakeland, FL (US); Arleta Krystyna Skrzynska, Lakeland, FL (US)

(73) Assignee: ATARRAYA, INC., Lakeland, FL (US)

( * ) Notice: Subject to any disclaimer, the term of this patent is extended or adjusted under 35 U.S.C. 154(b) by 0 days.

(21) Appl. No.: 18/178,617

(22) Filed: Mar. 6, 2023

(65) Prior Publication Data

US 2023/0200359 A1 Jun. 29, 2023

Related U.S. Application Data

(63) Continuation of application No. PCT/US2021/054263, filed on Oct. 8, 2021.
(Continued)

(51) Int. Cl.
*A01K 61/59* (2017.01)
*A01K 61/85* (2017.01)
*A01K 63/04* (2006.01)

(52) U.S. Cl.
CPC ............ *A01K 61/59* (2017.01); *A01K 61/85* (2017.01); *A01K 63/042* (2013.01)

(58) Field of Classification Search
USPC ....... 119/263, 201, 202, 203, 204, 207, 209, 119/210, 211, 226, 231, 232, 243, 268,
(Continued)

(56) References Cited

U.S. PATENT DOCUMENTS

| 5,377,624 A * | 1/1995 | Craig | A01K 61/54 119/234 |
| 8,820,266 B2 * | 9/2014 | Chibras | A01K 61/54 119/226 |

(Continued)

FOREIGN PATENT DOCUMENTS

| BR | 102016018419 | * 2/2018 | ............. B01D 29/41 |
| WO | WO 2018/191276 | * 10/2018 | ............. A01K 63/06 |

OTHER PUBLICATIONS

International Search Report to corresponding International Application PCT/US21/54263 dated Jan. 6, 2022 (1 page).

*Primary Examiner* — Andrea M Valenti
(74) *Attorney, Agent, or Firm* — Greenberg Traurig, LLP

(57) ABSTRACT

A system includes a housing; a water tank positioned within the housing, wherein an inside of the water tank is sealed to prevent contact between material forming the water tank and water within the water tank; a water movement subsystem causing water to circulate within the water tank, including a baffle extending along the center of the water tank dividing the water tank into a circular raceway, and a pump causing water to circulate; an aeration subsystem maintaining an oxygenation level suitable for crustaceans to live within the water tank; a temperature control subsystem maintaining a water temperature suitable for crustaceans to live within the water tank; a water quality monitoring subsystem monitoring a water quality parameter of water within the water tank; a feeding subsystem configured to dispense food into the water tank; a biofloc removal subsystem configured to remove biofloc from the water tank; and a control system.

19 Claims, 19 Drawing Sheets

Related U.S. Application Data

(60) Provisional application No. 63/089,206, filed on Oct. 8, 2020.

(58) Field of Classification Search
USPC .......................................................... 119/269
See application file for complete search history.

(56) References Cited

U.S. PATENT DOCUMENTS

| | | | |
|---|---|---|---|
| 11,130,100 B1 * | 9/2021 | Berg .................... | A01K 63/042 |
| 11,206,817 B2 * | 12/2021 | Kemp .................... | A01K 61/59 |
| 11,589,561 B2 * | 2/2023 | Goh ........................ | A01K 63/00 |
| 11,617,354 B2 * | 4/2023 | Kemp .................... | A01K 61/85 |
| | | | 119/211 |
| 2004/0107914 A1 * | 6/2004 | Untermeyer ........... | A01K 63/04 |
| | | | 119/215 |
| 2010/0263596 A1 * | 10/2010 | Schumann ........... | A01K 5/0275 |
| | | | 119/51.02 |
| 2015/0196002 A1 * | 7/2015 | Friesth ................... | C12M 43/00 |
| | | | 315/297 |
| 2015/0237890 A1 * | 8/2015 | Grajcar ................. | A01K 63/06 |
| | | | 119/200 |
| 2015/0250113 A1 * | 9/2015 | Shoham ................. | A01K 63/00 |
| | | | 47/62 R |
| 2015/0342156 A1 * | 12/2015 | Sheriff ................... | A01K 61/59 |
| | | | 119/211 |
| 2016/0016825 A1 | 1/2016 | Roberts | |
| 2018/0116184 A1 | 5/2018 | Kemp et al. | |
| 2018/0332830 A1 * | 11/2018 | Gordon ............... | B01D 61/025 |
| 2019/0141964 A1 | 5/2019 | Perslow et al. | |

* cited by examiner

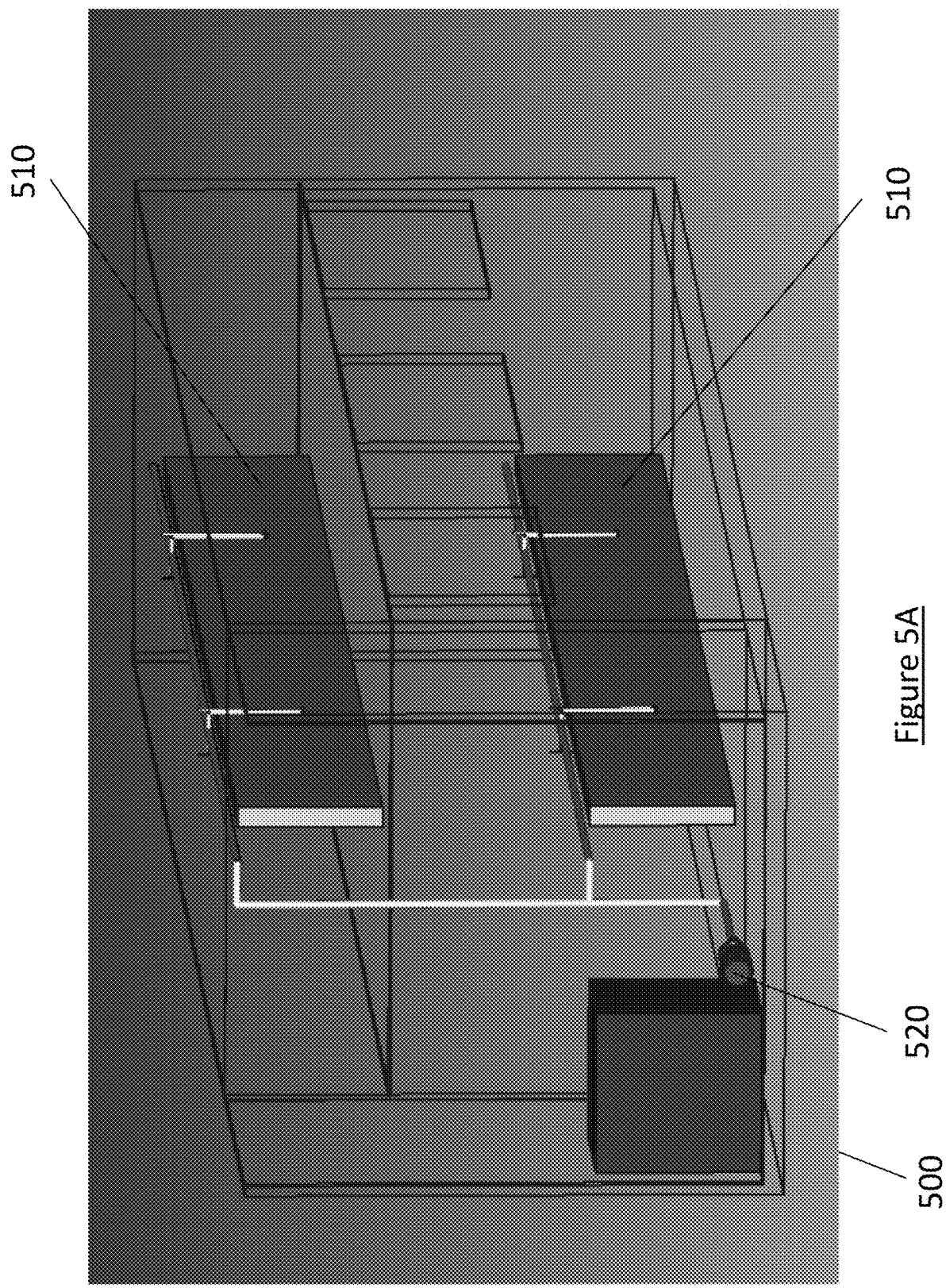

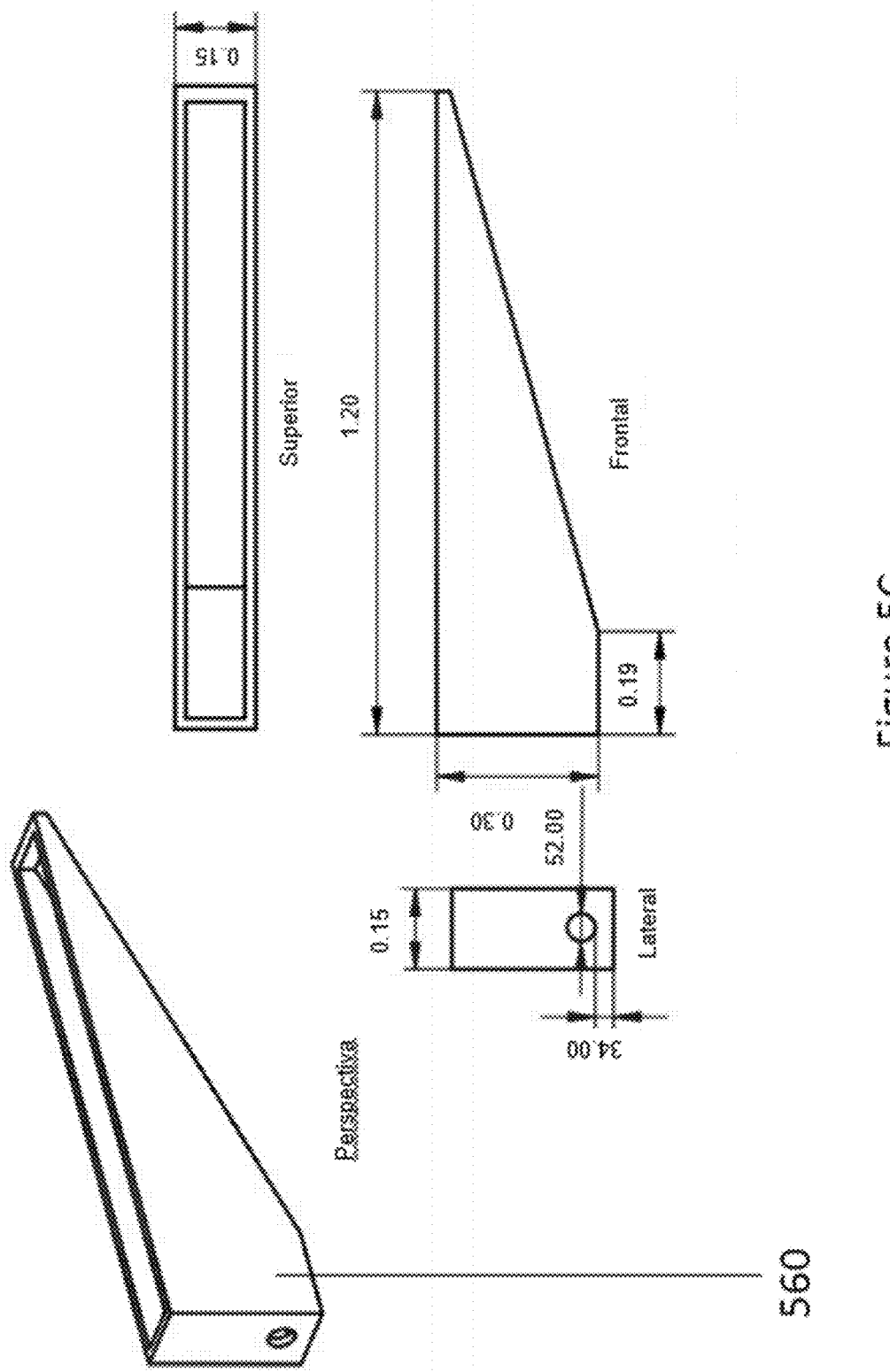

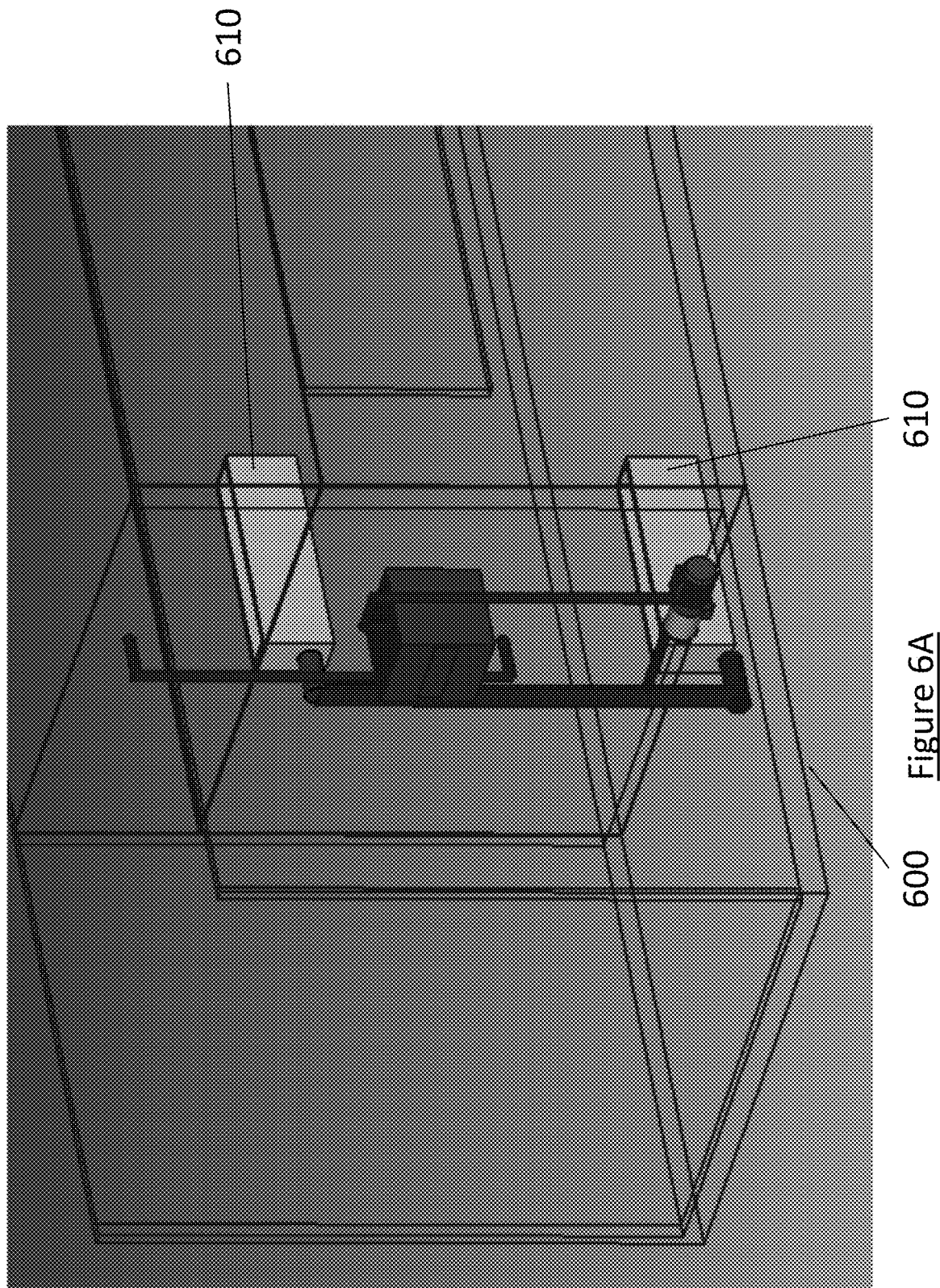

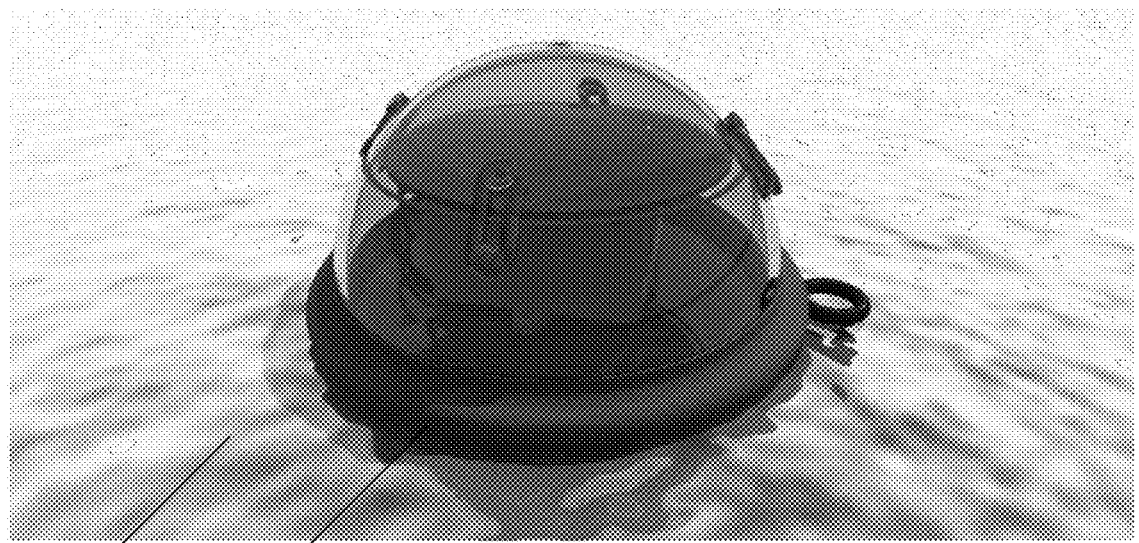
700  710  Figure 7A
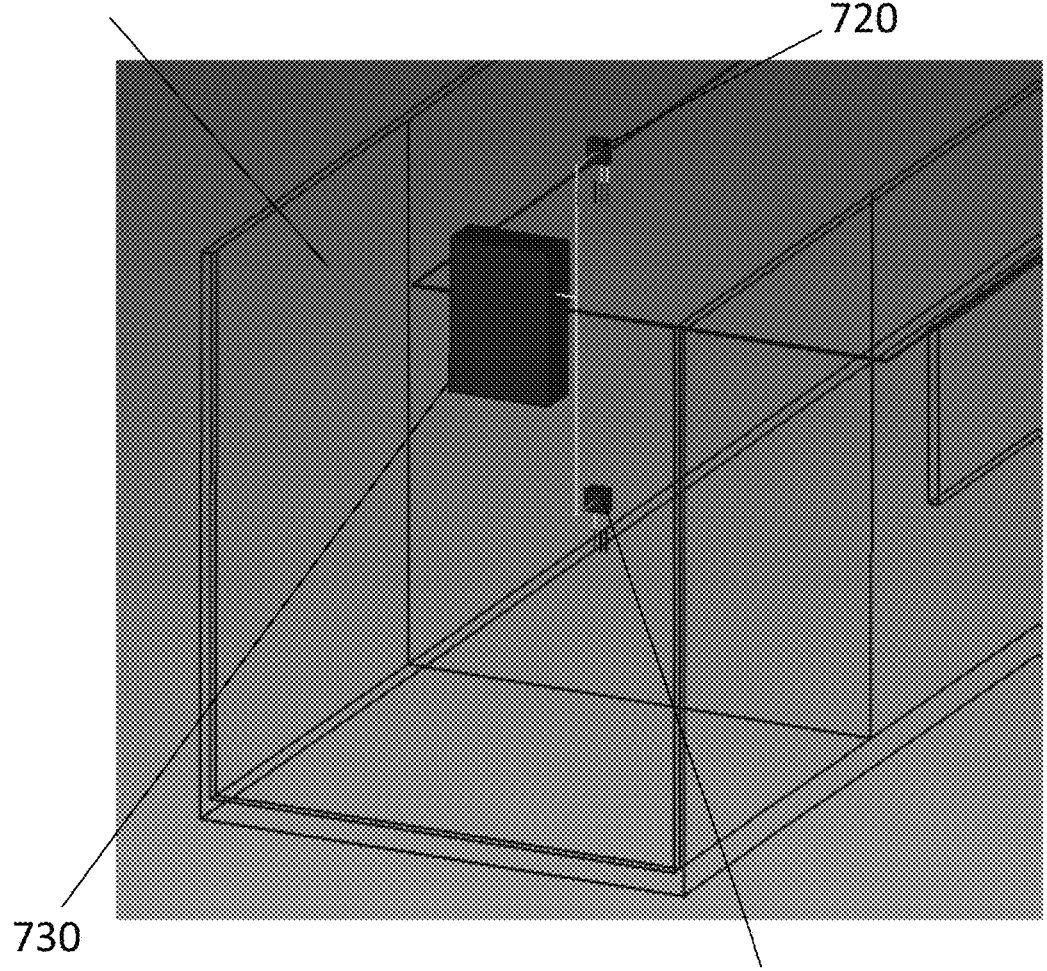
730  Figure 7B  720

SYSTEM AND METHOD FOR SHRIMP CULTIVATION

CROSS-REFERENCE TO RELATED APPLICATION

This application is a continuation application of International (PCT) Patent Application No. PCT/US2021/054263, filed Oct. 8, 2021, which relates to and claims the benefit of commonly-owned, U.S. Provisional Patent Application No. 63/089,206, filed on Oct. 8, 2020 and entitled "SYSTEM AND METHOD FOR SHRIMP CULTIVATION," the contents of which are incorporated herein by reference in their entirety.

FIELD OF THE INVENTION

The field of invention relates to systems and method for cultivation of crustaceans. More particularly, the field of invention relates to systems and methods for cultivation of shrimp requiring minimal user interaction.

BACKGROUND OF THE INVENTION

Shrimp and other crustaceans are commonly used as food. Due to sustainability concerns relating to harvesting of wild populations, farmed production of such animals is desirable. However, existing farming techniques suffer from low efficiency, involve use of harmful substances and excessive use of natural resources, and require significant user interaction.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 5A shows an exemplary water movement subsystem.

FIG. 5C shows an exemplary solids collection box.

FIG. 6A shows a first exemplary waste collection subsystem.

FIG. 7A shows an exemplary sensor unit.

FIG. 7B shows an exemplary water quality monitoring subsystem.

SUMMARY OF THE INVENTION

Figure 1:
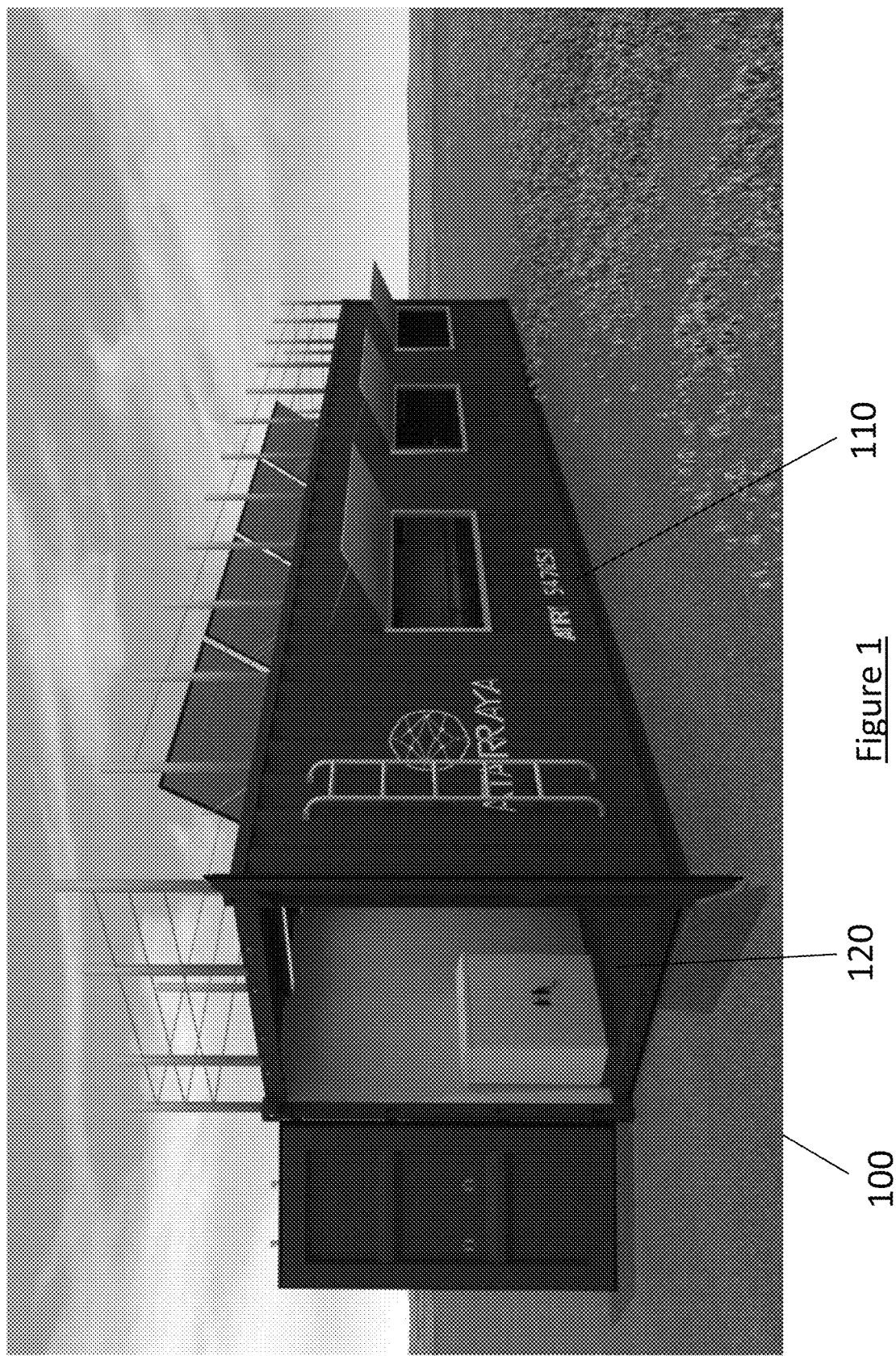
FIG. 1 shows an exemplary system for farm-raising shrimp.

The exemplary embodiments relate to systems for farm-raising of shrimp, and related farming methods. In an embodiment, a system is self-contained. In an embodiment, hardware elements of a system are self-contained and are controlled by software and/or user controls that are located remotely, such as by "cloud" software. In an embodiment, hardware elements of a system are self-contained within a housing. In an embodiment, the housing is a shipping container of the type referred to as an "intermodal container".

In some embodiments, a system includes a housing containing one or more water tanks; a water movement system operable to cause water to circulate within the one or more water tanks; a main aeration system operable to maintain a desired oxygenation level within the one or more water tanks; a drain subsystem operable to remove waste material from the one or more water tanks; a temperature control subsystem operable to maintain a desired water temperature within the one or more water tanks; a water quality monitoring subsystem configured to monitor one or more water quality parameters of water within the one or more water tanks; and a feeding subsystem operable to dispense food into the one or more water tanks.

In some embodiments, the housing includes a shipping container. In some embodiments, the one or more water tanks includes two water tanks.

In some embodiments, a system includes a housing, wherein the housing is an intermodal container; at least one water tank positioned within the housing, wherein an inside of each of the at least one water tank is sealed so as to prevent contact between a material forming the at least one water tank and water within the at least one water tank; a water movement subsystem operable to cause water to circulate within the at least one water tank, wherein the water movement system comprises: at least one baffle extending longitudinally along a portion of a center of the at least one water tank so as to divide the at least one water tank into a generally circular raceway; and at least one pump configured to cause water to circulate about the at least one baffle; an aeration subsystem configured to maintain an oxygenation level within the at least one water tank, wherein the oxygenation level is suitable for crustaceans to live within water in the at least one water tank; a temperature control subsystem operable to maintain a water temperature within the at least one water tank, wherein the water temperature is suitable for crustaceans to live within water in the at least one water tank; a water quality monitoring subsystem configured to monitor at least one water quality parameter of water within the at least one water tank, wherein the at least one water quality parameter includes a temperature, a dissolved oxygen concentration, a nitrogen concentration, a phosphate concentration, a pH, and a salinity; a feeding subsystem configured to dispense food into the at least one water tank; a biofloc removal subsystem configured to remove biofloc from the at least one water tank; and a computer-operated control system configured to operate the water movement system, the aeration system, the temperature control subsystem, the water quality monitoring subsystem, and the feeding subsystem.

In some embodiments, the aeration subsystem includes at least one main air tube extending above each of the at least one water tank, and a plurality of branch tubes extending away from each of the at least one main air tube into water within the at least one water tank, wherein each of the plurality of branch tubes includes aeration tubing. In some embodiments, each of the plurality of branch tubes further includes PVC tubing. In some embodiments, the PVC tubing has a diameter of ½ inch. In some embodiments, the aeration tubing includes porous tubing having an average pore size that is in a range of from 0.001 inch to 0.004 inch. In some embodiments, the aeration subsystem includes a main aeration subsystem and a secondary aeration subsystem. In some embodiments, the secondary aeration subsystem includes at least one venturi eductor coupled to the water movement subsystem.

In some embodiments, the feeding subsystem includes a scale; a feed container positioned on the scale; a valve positioned at a bottom of the feed container and operable to allow feed to pass therethrough when the valve is in an open position; and a feeding tube coupled to the aeration subsystem and the valve such that air provided by the aeration subsystem propels feed passing through the valve into the at least one water tank. In some embodiments, the system includes one of the feeding subsystem for each of the at least one water tank.

In some embodiments, the at least one water tank includes a first water tank positioned at a bottom of the housing and a second water tank positioned above the first water tank. In some embodiments, the system also includes a support structure configured to support weight of at least the second water tank.

In some embodiments, each of the at least one water tank has a volume that is in a range of from 10 cubic meters to 50 cubic meters.

In some embodiments, the system also includes a control room positioned at a first end of the housing.

In some embodiments, the system is configured to support presence of biofloc within the at least one water tank. In some embodiments, the computer-operated control system is configured to support presence of biofloc within the at least one water tank by controlling a ratio of carbon to nitrogen within water within the at least one water tank. In some embodiments, the computer-operated control system is configured to support presence of biofloc within the at least one water tank by controlling the ratio of carbon to nitrogen within water within the at least one water tank to be in a range of from 12:1 to 20:1.

In some embodiments, the biofloc removal subsystem includes a decanter positioned within each of the at least one water tank such that excess water within the decanter overflows into the at least one water tank, wherein the decanter is shaped such that biofloc within water in the decanter settles to a bottom of the decanter; a pump configured to pump water from each of the at least one water tank and into the decanter; a drain pump operable to remove biofloc from the bottom of the decanter when the drain pump is activated; and a biofloc aeration arrangement operable to cause air to flow into the bottom of the decanter when the biofloc aeration arrangement is activated, thereby to cause biofloc to mix within water within the decanter and to overflow into the at least one water tank. In some embodiments, the biofloc aeration arrangement includes a valve that is operable to activate the aeration arrangement; and an aeration tube that is coupled to the valve and to the aeration subsystem.

In some embodiments, the system also includes a drain subsystem operable to remove waste material from the at least one water tank.

In some embodiments, each of the at least one water tank is sealed by a water-resistant paint.

DETAILED DESCRIPTION OF THE INVENTION

The exemplary embodiments relate to systems for farm-raising of shrimp, and related farming methods. In an embodiment, a system is self-contained. In an embodiment, hardware elements of a system are self-contained and are controlled by software and/or user controls that are located remotely, such as by "cloud" software. In an embodiment, hardware elements of a system are self-contained within a housing. In an embodiment, the housing is a shipping container of the type referred to as an "intermodal container". FIG. 1 shows a rendering of an exemplary system 100.

In some embodiments, the exemplary system 100 is configured to raise and harvest crustaceans such as shrimp through biofloc culture. It will be known to those of skill in the art that biofloc aquaculture describes an aquaculture practice in which waste materials (e.g., unused food and excreta) are converted to a protein-rich live feed by microbes present within the water. It will be further known that the term "biofloc" refers to a heterogeneous aggregate of organisms such as microalgae, bacteria, protozoa, zooplankton, and nematodes, as well as feces and uneaten food, which is typically held together by mucus secreted by bacteria, and which typically range in size from 50 to 200 microns. In some embodiments, use of biofloc aquaculture enables shrimp to be produced in a sustainable manner.

In some embodiments, an exemplary system 100 includes a retrofitted 12-meter-long shipping container 110 (e.g., a housing) that has been subdivided to include two tanks, each 10 meters long and 80 centimeters deep, and positioned one over the other, with a control room 120 provided in the remaining space at a first end of the shipping container 110. In some embodiments, an exemplary system 100 includes hatches to provide access to each tank.

Figure 2A:
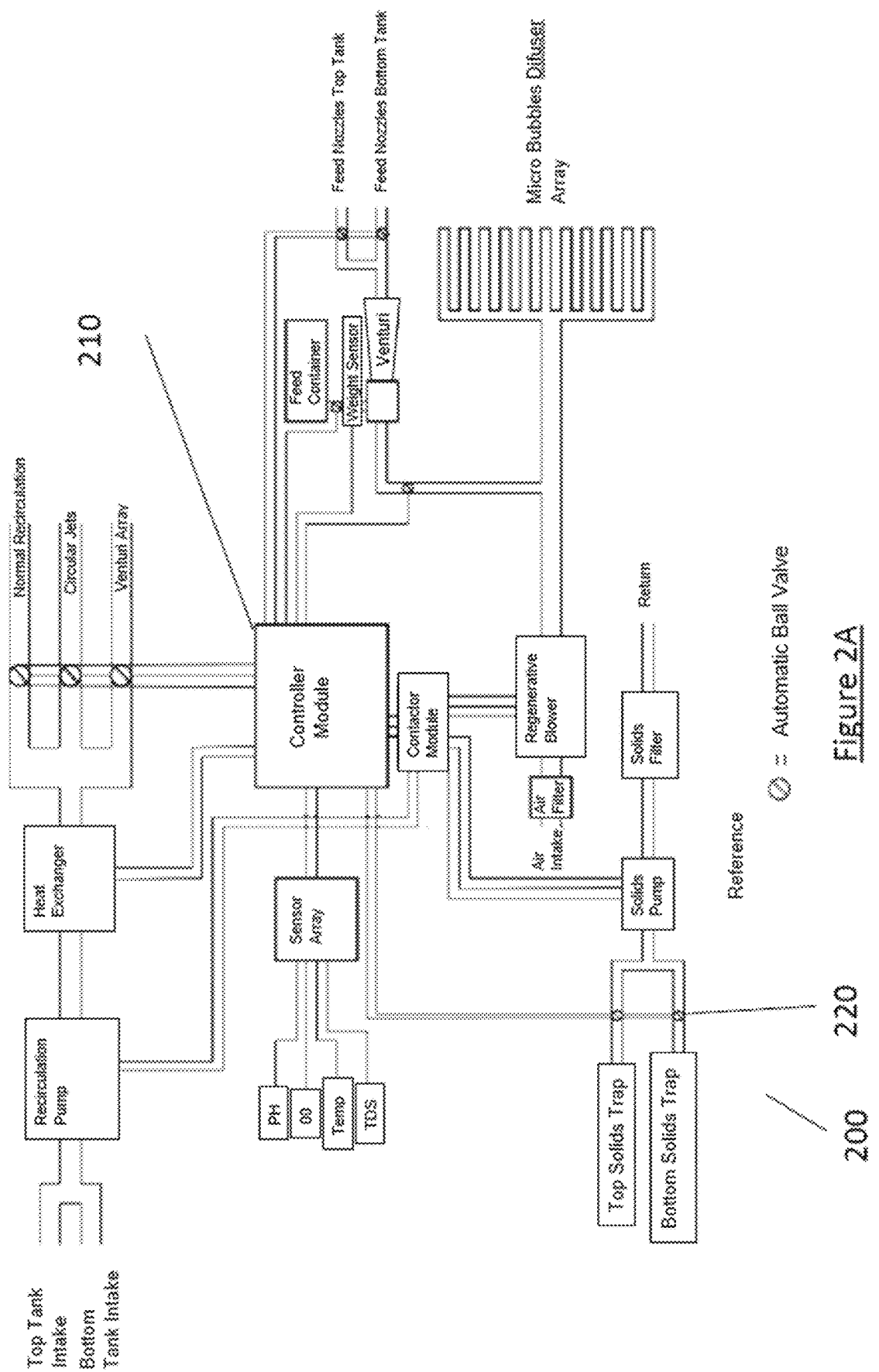
FIG. 2A shows a first exemplary schematic illustration of the elements of an exemplary system.
Figure 2B:
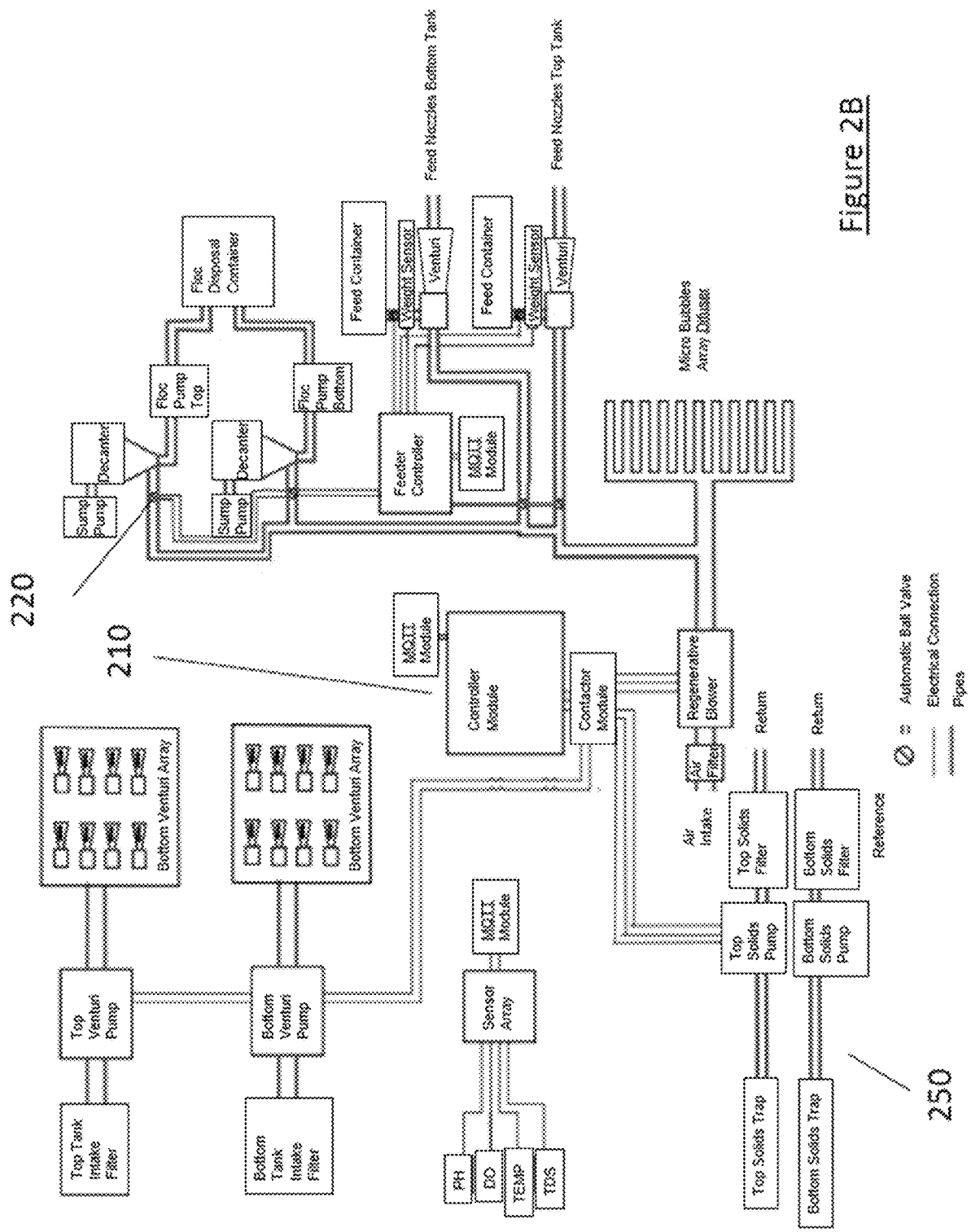
FIG. 2B shows a second exemplary schematic illustration of the elements of an exemplary system.
Figure 2C:
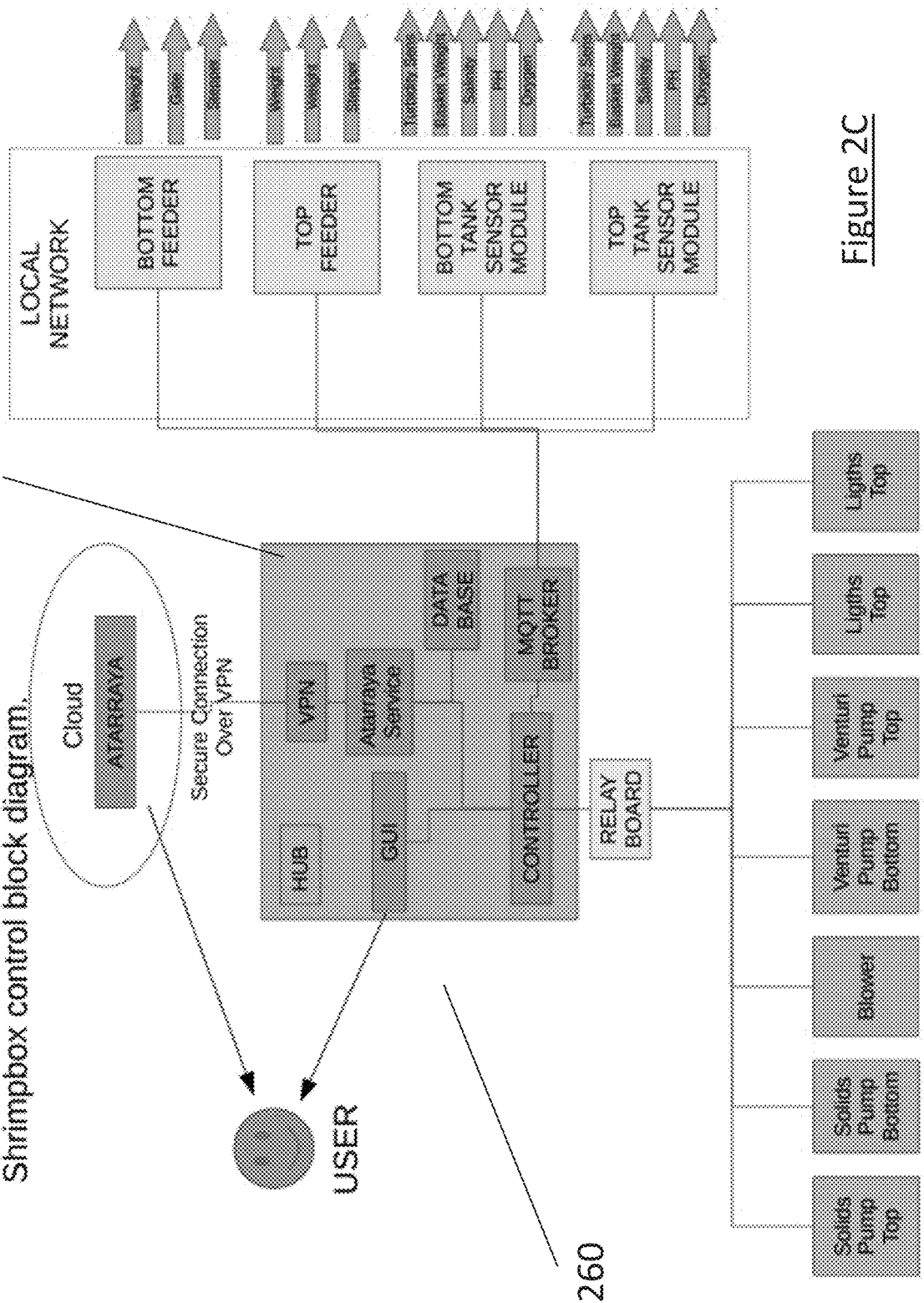
FIG. 2C shows an exemplary software control block diagram of an exemplary system.
Figure 2D:
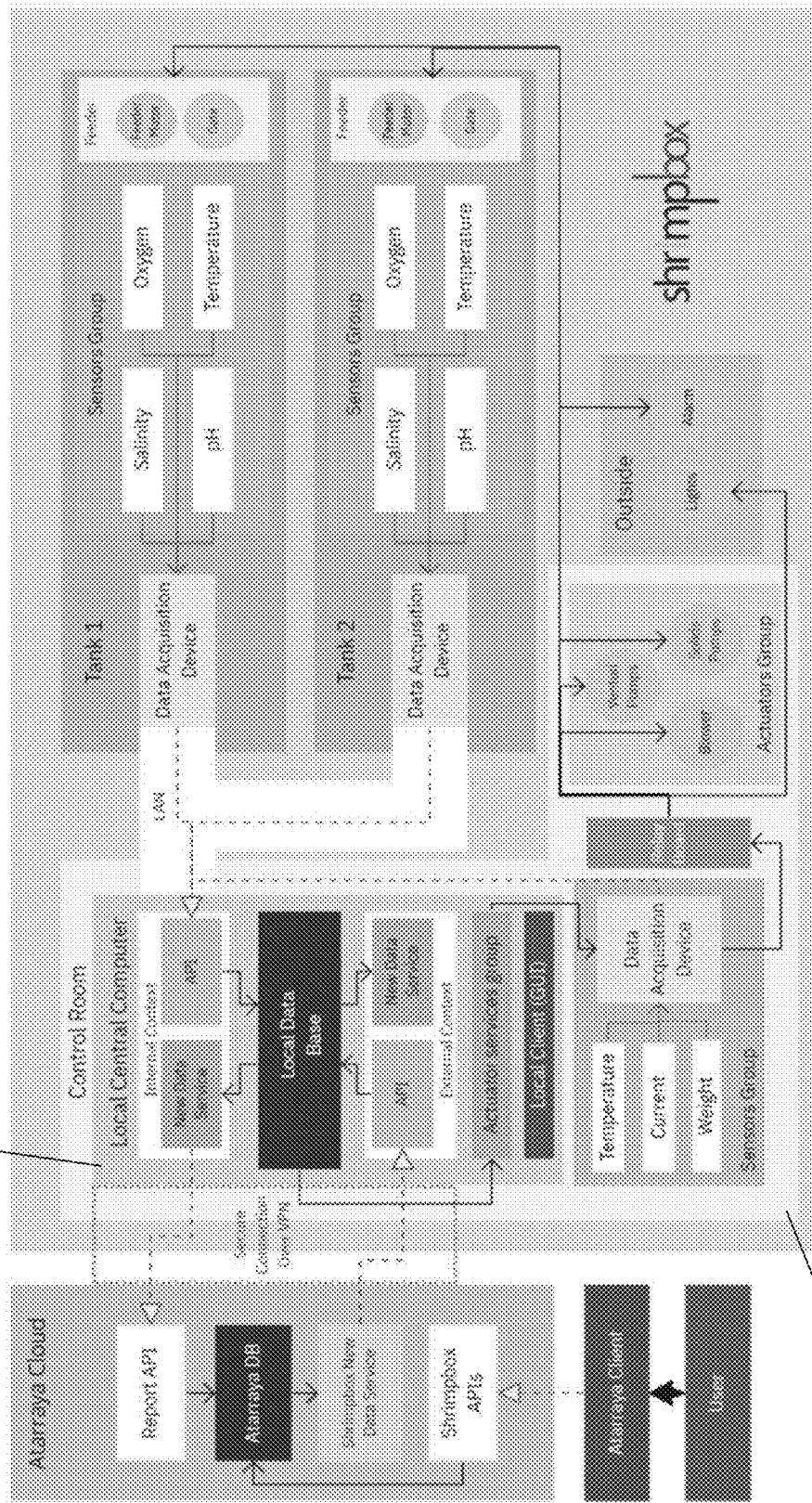
FIG. 2D shows an exemplary software control block diagram of an exemplary system.
Figure 2E:
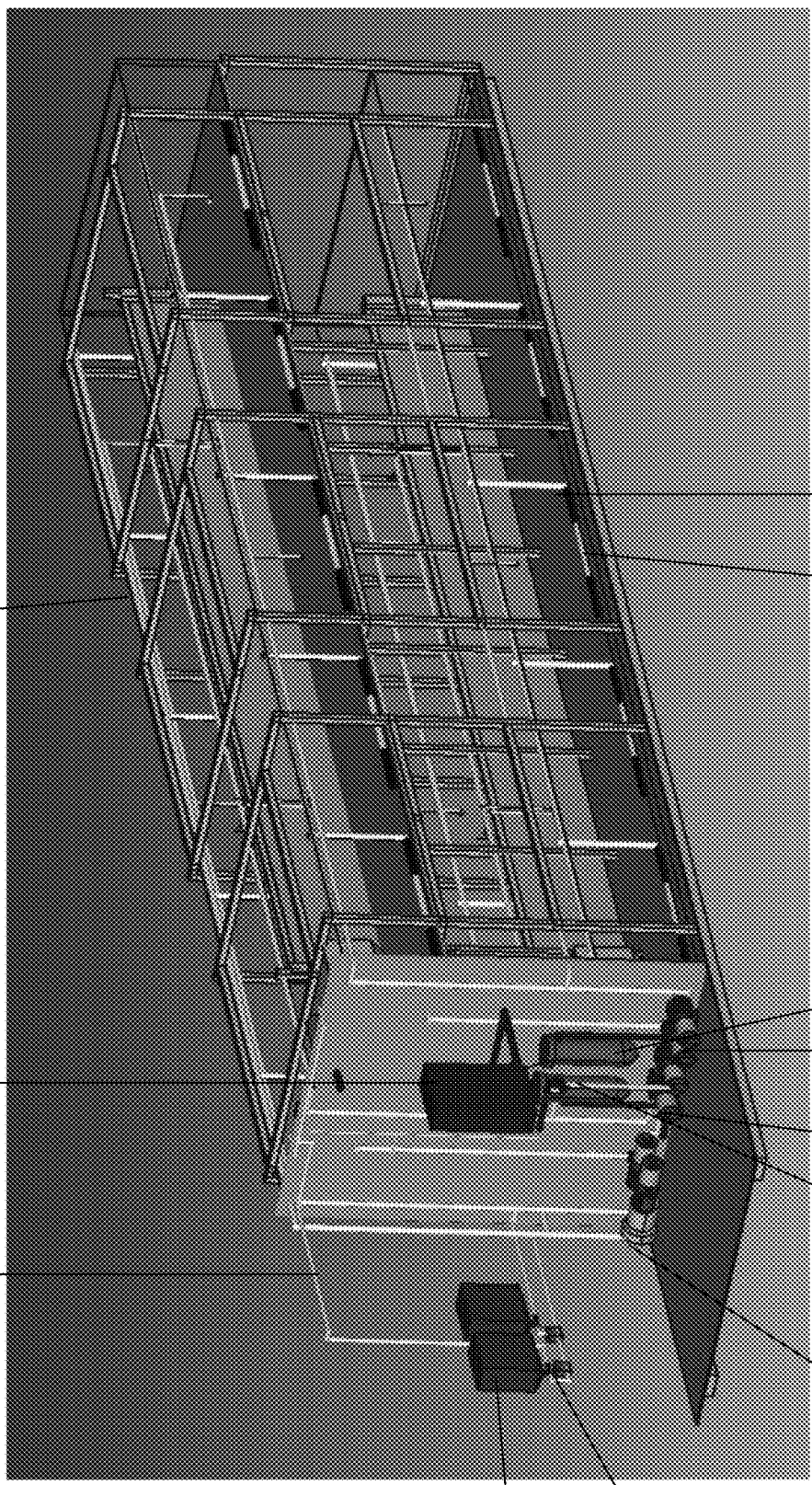
FIG. 2E shows elements of an exemplary system.

FIG. 2A shows a first exemplary schematic block diagram 200 of the exemplary system 100. FIG. 2B shows a second exemplary block diagram 250 of the exemplary system 100. In some embodiments, the system 100 includes a main controller 210 (e.g., a computer-operated control system including a combination of hardware and software) that has internet access (e.g., via a WiFi connection) enabling the controller 210 to be controlled by algorithms operating either locally or on a remote server. In some embodiments, the control algorithms are operative to receive monitoring data (e.g., as described herein) and provide an indication of water quality. In some embodiments, the control algorithms are operable to trigger a corrective action based on the indication of water quality. In some embodiments, the controller can operate autonomously in accordance with established instructions in the event of lost connectivity with the server. In some embodiments, flows of water and air are controlled by automatic ball valves 220 that are operable by the main controller 210 in order to allow the control algorithms to control the various settings that are needed during the production cycle. For clarity, only one of the ball valves 220 is specifically identified in each of FIG. 2A and FIG. 2B. In some embodiments, the automatic ball valves 220 are of the type commercialized by U.S. Solid of Cleveland, Ohio. In some embodiments, the system 100 includes a main panel having a contactor section that interfaces the main controller with devices that need electrical power. In some embodiments, all valves 220, motors, etc., are located in the control room 120. FIG. 2C shows an exemplary software control block diagram 260 including software running on the controller 210 and connections from the controller 210 to the remaining elements of the system 100, as described herein. FIG. 2D shows an exemplary software control block diagram 270 including software running on the controller 210 and connections from the controller 210 to the remaining elements of the system 100, as described herein. FIG. 2E shows a rendering of the exemplary system 100 with the shipping container 110 not shown to allow internal elements of the system 100 to be seen.

Figure 3A:
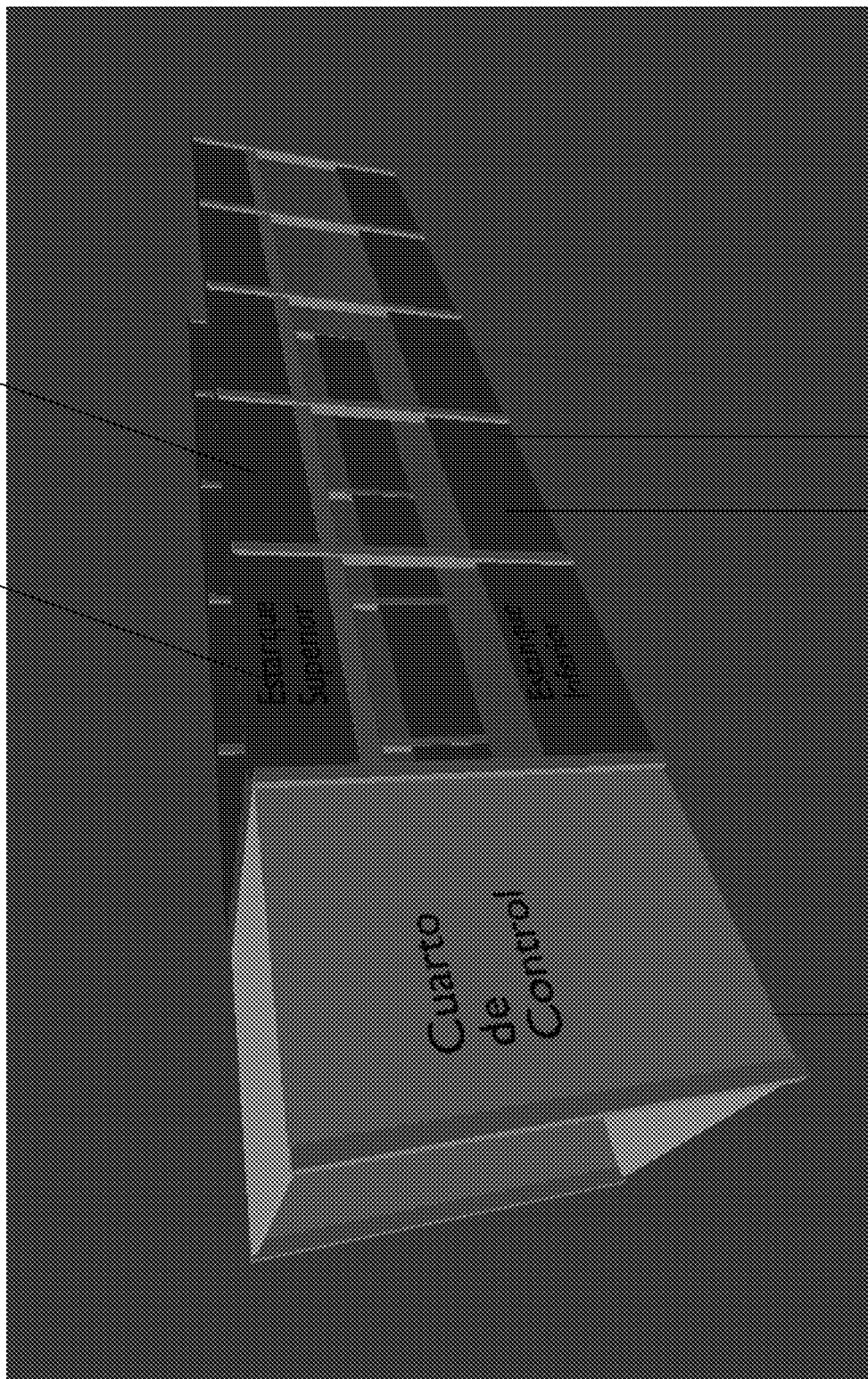
FIG. 3A shows the general layout of space within an exemplary system.
Figure 3B:
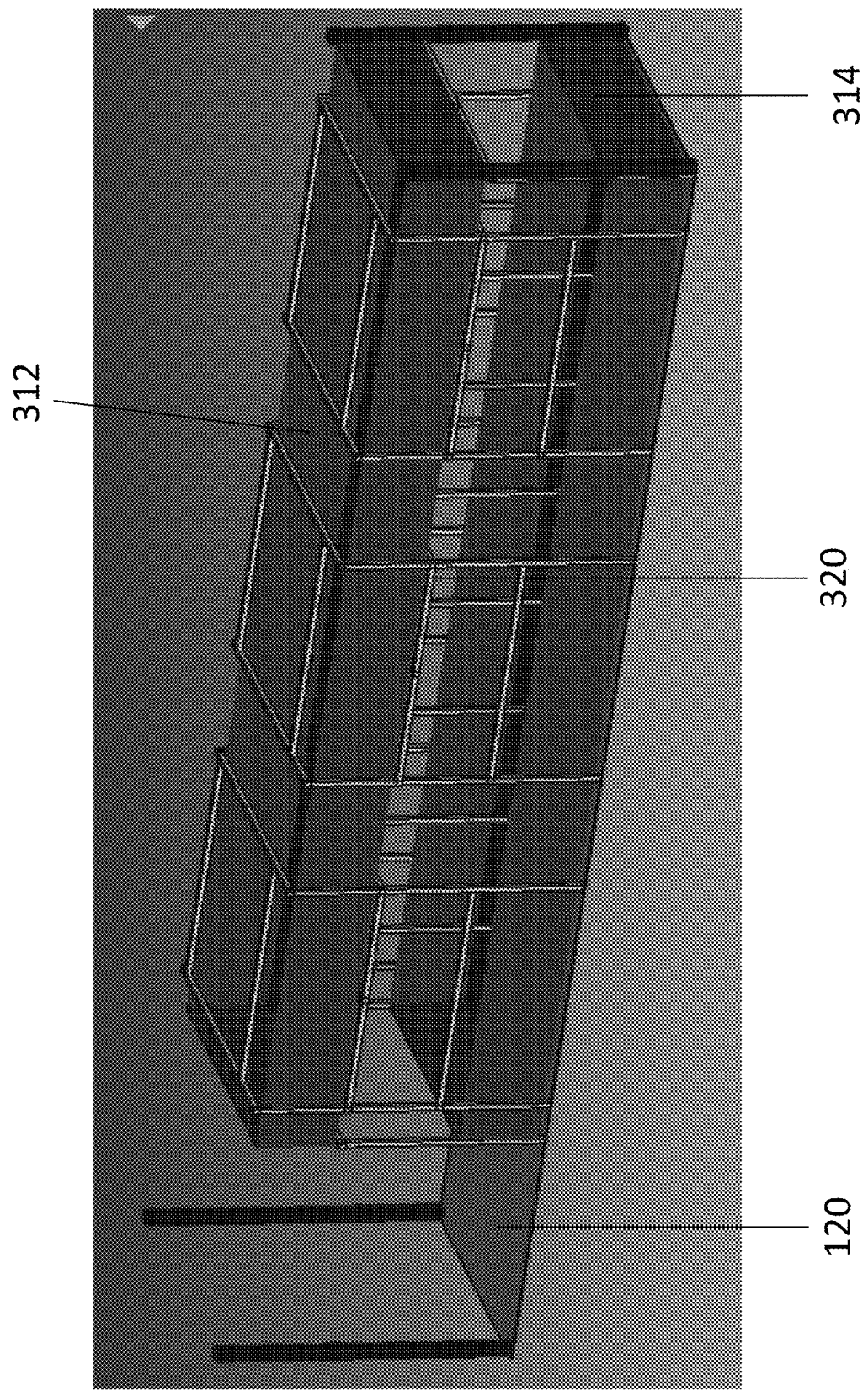
FIG. 3B shows the general layout of structural elements of an exemplary system.

FIG. 3A shows a general schematic view of the system 100 with the shipping container 110 not shown, allowing view of the major structural elements of the system 100. As shown in FIG. 3A, the system 100 includes a control room 120 as discussed above and water tanks 310. In some embodiments, the system 100 includes an upper water tank 312 and a lower water tank 314. Throughout this disclosure, the term "water tank 310" will be used to refer generically to either water tank and related elements, while the terms "upper water tank 312" and "lower water tank 314" will be used to refer to a specific one of the water tanks. FIG. 3B shows a general schematic view of structural elements of the system 100 with the shipping container 110 not shown. As shown in FIG. 3B, the system 100 includes a support structure 320 supporting the water tanks 310. In some embodiments, the support structure 320 includes a reinforcement of the main structure of the shipping container 110. In some embodiments, the support structure 320 includes a base to support the upper water tank 312.

In some embodiments, production of shrimp begins with shrimp at the postlarva stage of the life cycle (e.g, at an average weight of less than 10 milligrams). In some embodiments, shrimp postlarva are those commercialized by Maricultura Vigas Sapi de CV of Lerma, Campeche, Mexico. In some embodiments, shrimp postlarva are free of disease. In some embodiments, juvenile shrimp are introduced into the exemplary system 100. In some embodiments, the juvenile shrimp used in the exemplary system 100 have an average weight of 1 gram. In some embodiments, juvenile shrimp are provided into each water tank 310 (e.g., the lower tank 314 and the upper tank 312) of the exemplary system at an average density of 400 shrimp per square meter of plan view area. In some embodiments, each water tank 310 is 10 meters in length and 2.4 meters in width, yielding a plan view area of 24 square meters. In some embodiments, each water tank 310 has a depth of 0.8 meters, yielding a useful volume of 19.2 cubic meters. In some embodiments, each tank has a useful volume that is in a range of 10 cubic meters to 50 cubic meters. In some embodiments, each tank has a useful volume that is in a range of 10 cubic meters to 40 cubic meters. In some embodiments, each tank has a useful volume that is in a range of 10 cubic meters to 30 cubic meters. In some embodiments, each tank has a useful volume that is in a range of 5 cubic meters to 50 cubic meters. In some embodiments, each tank has a useful volume that is in a range of 5 cubic meters to 40 cubic meters. In some embodiments, each tank has a useful volume that is in a range of 5 cubic meters to 30 cubic meters. In some embodiments, each tank has a useful volume that is in a range of 12 cubic meters to 28 cubic meters. In some embodiments, each tank has a useful volume that is in a range of 14 cubic meters to 26 cubic meters. In some embodiments, each tank has a useful volume that is in a range of 15 cubic meters to 25 cubic meters. In some embodiments, each tank has a useful volume that is in a range of 16 cubic meters to 24 cubic meters. In some embodiments, each tank has a useful volume that is in a range of 17 cubic meters to 23 cubic meters. In some embodiments, each tank has a useful volume that is in a range of 18 cubic meters to 22 cubic meters. In some embodiments, each tank has a useful volume that is in a range of 19 cubic meters to 21 cubic meters. In some embodiments, each tank has a useful volume that is in a range of 19 cubic meters to 20 cubic meters. In some embodiments, each tank has a useful volume that is in a range of 19 cubic meters to 19.5 cubic meters.

In some embodiments, each water tank 310 is linked with a geomembrane. In some embodiments, each water tank 310 is lined with high density polyethylene ("HDPE") having a thickness of 0.8 mm. In some embodiments, each water tank 310 includes a diffuse air aeration system, in which air is injected into the system through a blower and aeration tubes, as will be described in further detail hereinafter. In some embodiments, each water tank 310 includes a baffle (e.g., an artificial substrate) that increases the surface area of each water tank 310. In some embodiments, each baffle is 8 meters wide and 0.8 meters high (e.g., is sufficiently tall to span the entire depth of the water in the tank). In some embodiments, each baffle has a surface area of 6.4 square meters per side, and 12.8 square meters total for both opposing sides. In some embodiments, each baffle is made from a felt material such as the type of material used to line automobile floors (e.g., the material commercialized under part number #MTCARPE20000030GRE01UA by Goldwheel USA Inc. of Irwindale, California. In some embodiments, shrimps will be fed for 24 hours/day, using automatic pneumatic feeders.

In some embodiments, the ratio of carbon to nitrogen within the water of the water tanks 310 is controlled to accelerate the formation of bioflocs in the water. In some embodiments, the ratio of carbon to nitrogen is controlled to be 16:1, or to be about 16:1, or to be between 15:1 and 17:1, or to be between 14:1 and 18:1, or to be between 13:1 and 19:1, or to be between 12:1 and 20:1. In some embodiments, the ratio of carbon to nitrogen is controlled through organic fertilization. In some embodiments, organic fertilization uses sugar as a carbon source.

In some embodiments, a water quality management process includes monitoring of water quality parameters including temperature, dissolved oxygen concentration, nitrogen concentration, phosphate concentration, pH, and salinity of water within each water tank 310 (e.g., the upper tank 312 and the lower tank 314). In some embodiments, water quality parameters are monitored by automatic probes that are connected to both tanks. In some embodiments, the automatic probes provide real-time measurements of water quality parameters. In some embodiments, water quality parameters are measured daily. In some embodiments, pH is measured by a titration method such as American Public Health Association Method 2320. In some embodiments, an optimal pH for the growth of shrimp is between 7.5 and 8.5. However, consumption of inorganic carbon by autotrophic bacteria present in the biofloc can cause a decrease in the pH of the water. To remedy this decrease in pH, in some embodiments, if correction of pH is needed, hydrated lime (e.g., calcium hydroxide)) is added to the water. In some embodiments, the hydrated lime is added at a concentration of 0.05 grams per liter. In some embodiments, correction of the pH of the water allows the water in the tanks to be used for many cycles, thereby contributing to the zero-waste nature of the exemplary system.

In some embodiments, nitrogen levels are evaluated by monitoring daily ammonia levels. In some embodiments, nitrogen levels are evaluated by monitoring daily nitrite levels. In some embodiments, phosphate levels are evaluated by monitoring orthophosphate levels on a weekly basis.

In some embodiments, the concentration of total suspended solids is periodically determined. In some embodiments, the concentration of total suspended solids is determined on a weekly basis. In some embodiments, the concentration of total suspended solids is kept at 500 milligrams per liter. In some embodiments, excess suspended solids are the concentration of total suspended solids is controlled through the use of filters as will be descried in greater detail hereinafter.

In some embodiments, the volume of sedimentable flakes is periodically quantified. In some embodiments, the volume of sedimentable flakes is quantified three times per week. In some embodiments, the volume of sedimentable flakes is quantified through use of an Imhoff cone. In some embodiments, a typical acceptable range of volume of sedimentable flakes is from 10 to 15 milliliters per liter. In some embodiments, if the volume of sedimentable flakes exceeds an acceptable range, the system is operated so as to clarify the solids (e.g., remove some of the sedimentable flakes by use of the waste collection subsystem).

In some embodiments, a probiotic is periodically applied to help maintain the quality of the water and the health of the shrimp. In some embodiments, the probiotic used is the probiotic commercialized under the trade name SANOLIFE by INVE Aquaculture of Salt Lake City, Utah. In some embodiments, the probiotic is applied directly to the water. In some embodiments, the probiotic is applied directly to the water two times per week. In some embodiments, the probiotic is applied directly to the water at a concentration of 0.5 ppm. In some embodiments, the probiotic is applied by mixing in with food. In some embodiments, the probiotic is applied by mixing in with food on a daily basis. In some embodiments, the probiotic is applied by mixing in with food at a concentration of 3 grams of probiotic per kilogram of food. In some embodiments, the probiotic is applied both by application directly to the water and by mixing in with food.

In some embodiments, at the outset of cultivation, an initial biometry is performed to estimate the average weight of shrimp to be cultivated. In some embodiments, the biometry is performed on a sample size of 100 shrimp. In some embodiments, during the cultivation period, biometry is periodically performed. In some embodiments, the periodic biometry is performed weekly. In some embodiments, the periodic biometry is performed on a randomly selected sample from each tank. In some embodiments, the sample size is 100 shrimp. In some embodiments, the sample is weighed. In some embodiments, each individual shrimp in the sample is weighed. In some embodiments, weighing is performed using a digital scale having an accuracy of 0.01 grams. In some embodiments, an average weight of the shrimp is calculated based on the measured weights of all sampled shrimp. In some embodiments, the amount of feed to be provided is adjusted on a weekly basis based on the average weight.

In some embodiments, to provide a safe environment for the growing of the organisms, exemplary systems include regenerative blowers and venturi tubes to maintain a good oxygen level in the water, centrifugal pumps to move water through the different components of the exemplary system, automatic feeders to provide a consistent and regular feeding schedule, monitoring equipment to inform control software (which will be described hereinafter) of levels of water quality variables, and a waste recollection system to collect feeding leftovers, skin shedding, etc. In some embodiments, a desirable oxygen level is at least 4 milligrams per liter. In some embodiments, a desirable oxygen level is at least 5 milligrams per liter. In some embodiments, these elements are positioned within the control room. In some embodiments, the control room includes an electrical load center capable of supplying sufficient electrical power to power these elements. In some embodiments, the control room includes an automatic power backup system in case of lack of utility power.

In some embodiments, the retrofitting of a standard shipping container to produce an exemplary system includes reinforcing the main structure of the shipping container to support the weight of both tanks, construction of a base (e.g., a metal base, although any other material capable of supporting sufficient weight could also be used) to support the upper tank 312, and construction of a dividing wall to separate the control room from the tanks. In some embodiments, existing container doors are used to provide access to the control room. In some embodiments, hatched openings are constructed to provide access to the upper tank 312 and the lower tank 314 to personnel. In some embodiments, the system includes one or more hatches on the top of the shipping container to provide access to the upper tank 312. In some embodiments, the system includes one or more hatches on the side(s) of the shipping container to provide access to the lower tank 314. In some embodiments, each water tank 310 is 10 meters long, 2.4 meters wide, and 0.8 meters deep. In some embodiments, each water tank 310 is made from a metal (or other material capable of providing sufficient structural strength). In some embodiments, each water tank 310 is sealed to prevent direct contact between the metal forming the water tank 310 and water within the water tank 310. In some embodiments, each water tank is sealed by lining with a geo-liner (e.g., a geomembrane including a material such as HDPE, linear low-density polyethylene, polyvinyl chloride, flexible polypropylene, chlorosulfonated polyethylene, or ethylene propylene diene terpolymer). In some embodiments, each water tank 310 is coated by an epoxy. In some embodiments, each water tank 310 is not lined. In some embodiments, the inside of each water tank 310 is painted so as to seal the water tank 310. In some embodiments, the inside of each water tank 310 is painted with a paint that is suitable to separate the metal forming the water tank 310 from the water within the water tank 310. In some embodiments, the inside of each water tank 310 is painted with a water-resistant paint that is suitable to separate the metal forming the water tank 310 from the water within the water tank 310. In some embodiments, the paint does not include hexavalent chromium or other mutagenic components. In some embodiments, each water tank 310 includes a waste collection subsystem, which includes a pumping system and a filtering system.

In some embodiments, an exemplary system includes at least one water pump providing water movement within the exemplary system. In some embodiments, the at least one water pump is capable of providing sufficient pressure to fill and drain the water tanks 310 as needed. In some embodiments, the at least one water pump is capable of providing sufficient water pressure for a supplementary oxygenation venturi system (described in further detail hereinafter). In some embodiments, the at least one water pump is capable of providing sufficient water pressure to provide circular movement to the water mass in order to allow for the collection of solids within the water mass. In some embodiments, the at least one water pump includes a centrifugal water pump. In some embodiments, the at least one water pump includes a centrifugal water pump having a power that is in a range of between 0.5 horsepower and 3 horsepower. In some embodiments, the at least one water pump includes a 2-horsepower centrifugal water pump. In some embodiments, the at least one water pump includes a 1.5 horsepower centrifugal water pump. In some embodiments, the at least one water pump is coupled to a piping arrangement that connects the at least one water pump to the different elements of the system (e.g., the tanks, the venturi system, etc.) referenced above). In some embodiments, the at least one water pump and any valves in the piping arrangement are positioned within the control room. In some embodiments, the at least one water pump is coupled to a jet array configured to impart a circular movement to the water in the water tanks 310, thereby enabling waste collection.

Figure 4A:
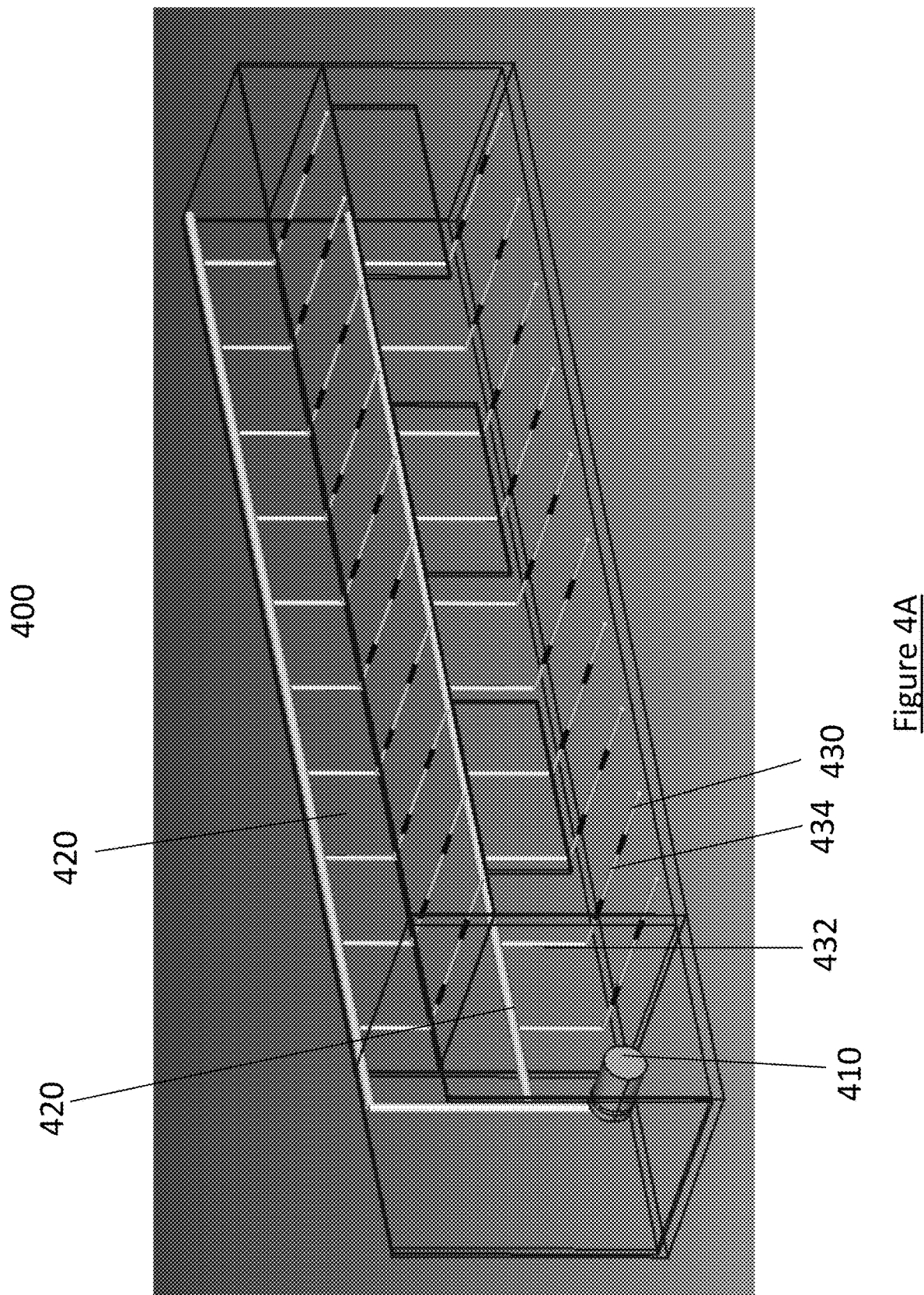
FIG. 4A shows a first exemplary main aeration subsystem.

In some embodiments, the exemplary system 100 includes a main aeration subsystem capable of providing a level of aeration within the tanks that is sufficient for cultivation of shrimp. In some embodiments, a sufficient oxygen level is at least 4 milligrams per liter. In some embodiments, a sufficient oxygen level is at least 5 milligrams per liter. FIG. 4A shows a first exemplary main aeration subsystem 400. In some embodiments, the main aeration subsystem 400 includes a regenerative blower 410. In some embodiments, the regenerative blower 410 is a 1.5 horsepower regenerative blower. In some embodiments, the regenerative blower 410 is a 1 horsepower regenerative blower. In some embodiments, the regenerative blower 410 is coupled to a network of tubes. In some embodiments, the network of tubes includes a main tube 420 running parallel to each tank 310. In some embodiments, the network of tubes includes a plurality of smaller branch tubes 430 extending away from each main tube 420 and across each tank 310. In some embodiments, each of the smaller branch tubes 430 includes a first portion 432 extending away from the corresponding main tube 420 and downward into the tank 310, and a second portion 434 extending away from the first portion 432 and across the tank 310. In some embodiments, the second portions 434 include aeration tubing.

Figure 4B:
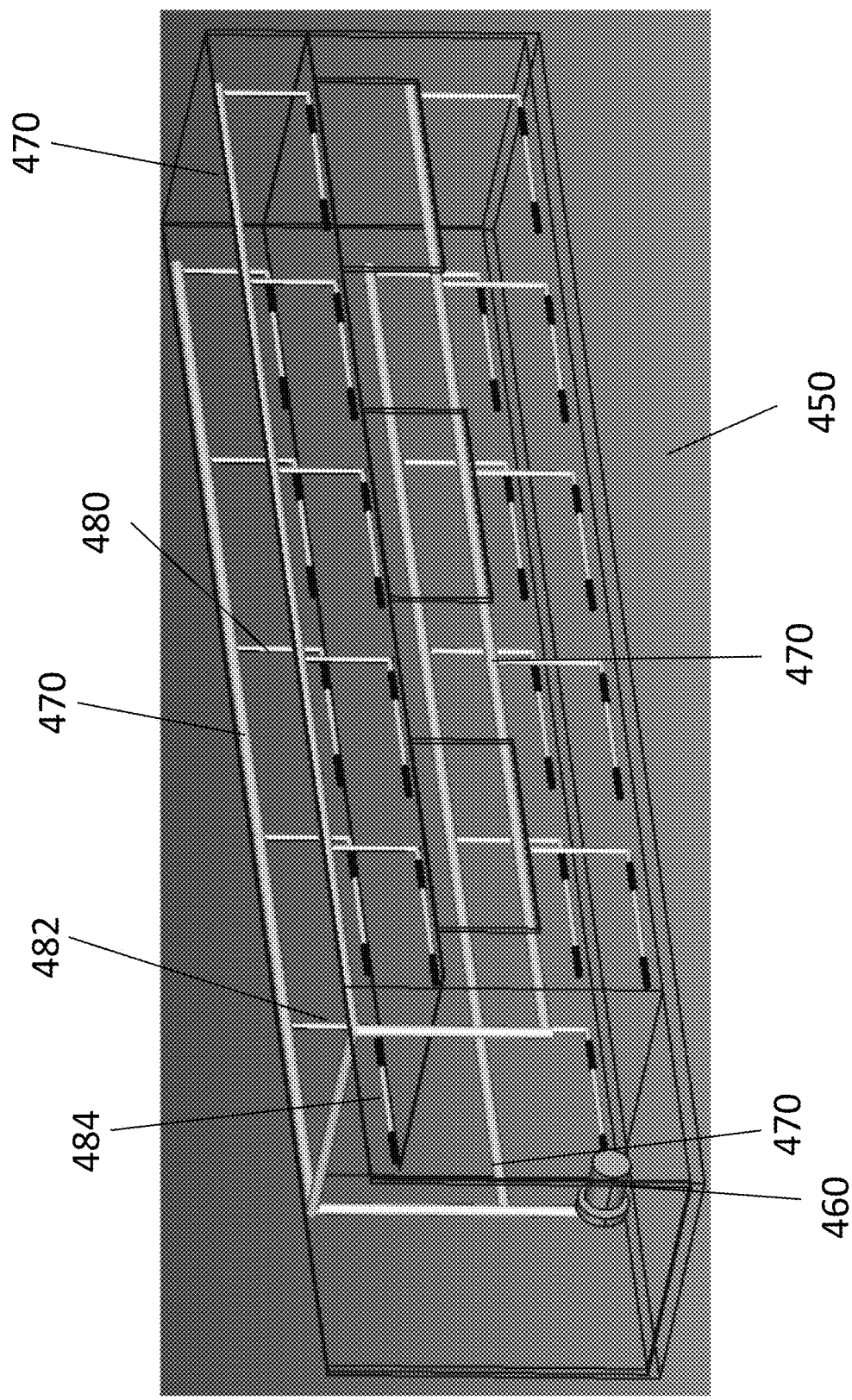
FIG. 4B shows a second exemplary main aeration subsystem.

FIG. 4B shows a second exemplary main aeration subsystem 450. In some embodiments, the main aeration subsystem includes a regenerative blower 460. In some embodiments, the regenerative blower 460 is a 1.5 horsepower regenerative blower. In some embodiments, the regenerative blower 460 is a 1 horsepower regenerative blower. In some embodiments, the regenerative blower 460 is coupled to a network of tubes. In some embodiments, the network of tubes includes two main tubes 470 for each tank 310. In some embodiments, the two main tubes 470 run above the tanks 310 along the length of each tank 310, with the two main tubes 470 for each tank running along opposite sides of each tank 310. In some embodiments, a plurality of smaller branch tubes 480 extends away from each of the main tubes. In some embodiments, each of the branch tubes 480 includes a first portion 482 that extends downward into each tank and a second portion 484 that extends along a portion of the length of the tank 310. In some embodiments, the second portions 484 of the branch tubes 480 are positioned along the floor of the tanks 310. In some embodiments, the second portions 484 include aeration tubing.

In some embodiments, some or all of the main tubes and branch tubes are made from aeration tubing. In some embodiments, some or all of the main tubes and branch tubes are made from porous plastic aeration tubing. In some embodiments, some or all of the main tubes and branch tubes are made from porous plastic aeration tubing including rubber and polyethylene. In some embodiments, some or all of the main tubes and branch tubes are made from porous plastic aeration tubing having pores of an average diameter that is in the range of 0.001 inches to 0.004 inches. In some embodiments, some or all of the main tubes and branch tubes are made from the aeration tubing commercialized under the trade name AERO-TUBE by Swan Products LLC of Marion, Ohio. In some embodiments, the aeration tubing is operable to provide microbubbles of oxygen to aerate the water. In some embodiments, some or all of the tubes include sections of PVC tubing interspersed with sections of aeration tubing. In some embodiments, the branch tubes include ½-inch diameter PVC tubing and aeration tubing.

In some embodiments, the system 100 includes a secondary aeration subsystem that is capable of supplementing the main aeration subsystem in the event that the oxygen level within the tanks is insufficient. In some embodiments, secondary aeration includes routing water from the circulation pump through the venturi tubes to provide additional aeration. It will be understood by those of skill in the art that venturi tubes use the differential pressure potential in a pipe to create a vacuum and suction from a second pipe. In the present case, in some embodiments, pressurized water is passed through a venturi manifold, thereby creating suction in a second tube that reaches the surface of the water and causing air to be pulled through the second tube. In some embodiments, the air is then mixed with the water and expelled at the output of the venturi as water mixed with fine air bubbles.

In some embodiments, the exemplary system includes a water movement subsystem capable of causing the water contained within the tanks to circulate therein. FIG. 5A shows an exemplary water movement subsystem 500. In some embodiments, the water movement subsystem 500 includes a baffle 510 positioned within each tank 310 and extending longitudinally along the center of each tank 310. In some embodiments, the baffle 510 changes the effective shape of the tank 310, causing the tank 310 to effectively be shaped as a circular raceway. In some embodiments, the baffle 510 is also configured to allow shrimp to attach thereto. In some embodiments, the baffle 510 is made from a synthetic material. In some embodiments, the baffle 510 is made from a material having a rough surface. In some embodiments, the rough surface of the baffle 510 allows shrimp to attach to the baffle 510 and allows acceleration of nitrifying bacteria. In some embodiments, the baffle 510 is made from car mat fabric. In some embodiments, the water movement subsystem includes an array of jets 520 positioned along the baffle 510. In some embodiments, the jets 520 point in opposite directions (e.g., jets 520 positioned on a first side of the baffle 510 are oriented to force water to flow away from the control room, while jets 520 positioned on an opposing second side of the baffle 510 are oriented to force water to flow toward the control room), thereby to impart a circular movement to the water when the jets 520 are active. In some embodiments, the water movement subsystem 500 can be turned on and off as needed by the main controller. For example, in some embodiments, the water movement subsystem 500 is turned on when it is necessary to collect solids (e.g., waste) from the bottom of the tank. In some embodiments, the water movement subsystem 500 is engaged to cause circulation at timed intervals. In some embodiments, the timed intervals are determined based on the feeding schedule. In some embodiments, the timed intervals are set to be a certain amount of time after feeding occurs in order to allow the shrimp sufficient time to feed and to determine the amount of leftover feed. In some embodiments, the water movement subsystem 500 is controlled by an automated valve that is configured to choose between normal or water movement recirculation. In some embodiments, based on requirements at a given time, the water movement subsystem 500 is configured to provide either: (1) normal recirculation, which does not impart circular movement to the water, but which provides sufficient movement to circulate water through the heat exchangers (described below) and allow for temperature control; (2) water movement recirculation, which imparts circular movement to the water; or (3) extra oxygenation, which cycles water through the venturi tubes for additional oxygenation, as discussed above.

Figure 5B:
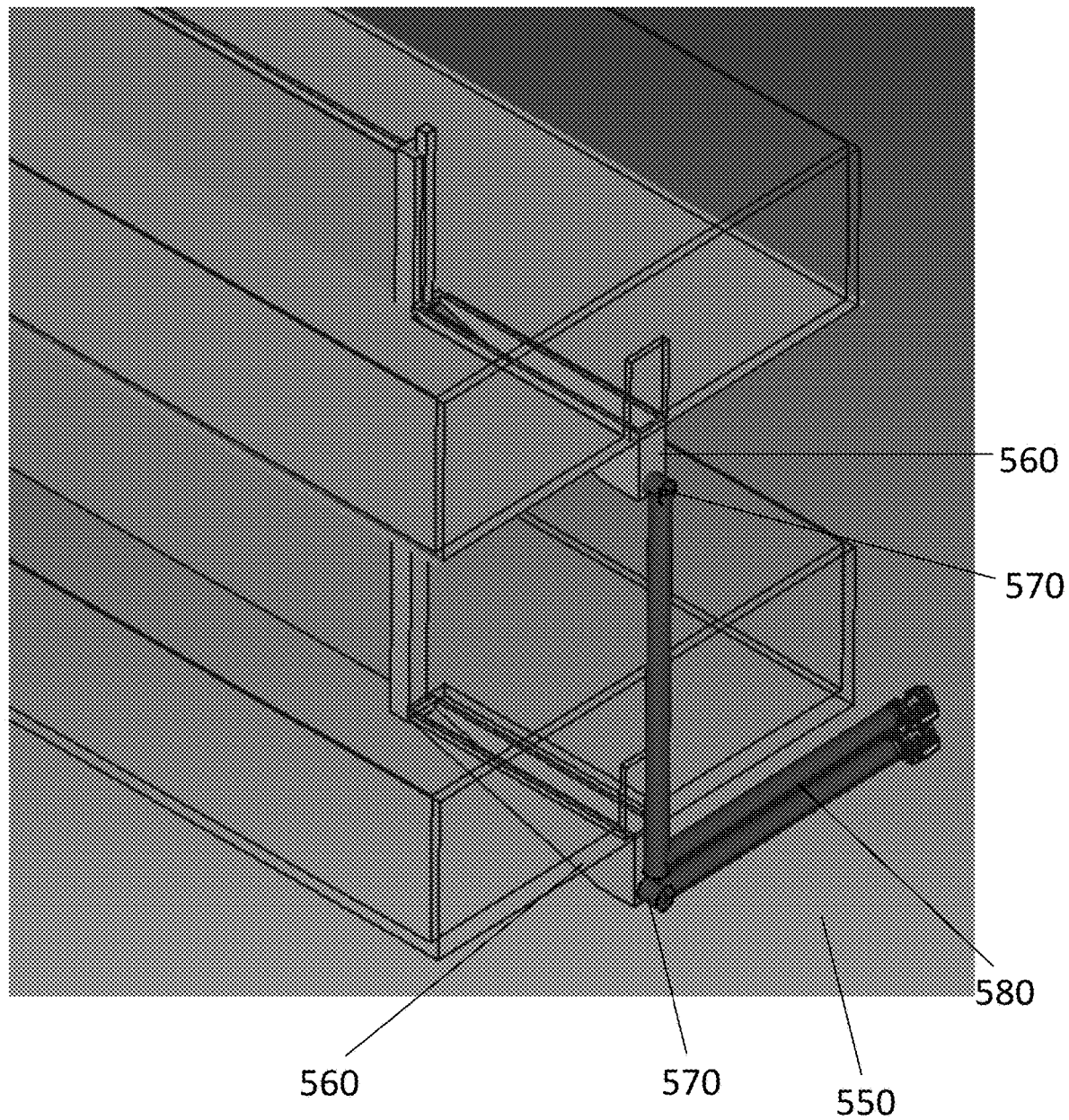
FIG. 5B shows an exemplary drainage subsystem.

FIG. 5B shows an exemplary drainage subsystem 550. In some embodiments, the drainage subsystem 550 operates in cooperation with the water movement supplied by the water movement subsystem 500. In some embodiments, the drainage subsystem 550 includes a solids collection box 560 in the bottom of each water tank 310. FIG. 5C shows various views of an exemplary solids collection box 560. In some embodiments, water movement supplied by the water movement subsystem 500 causes solids to circulate within each water tank 310 and settle into the solids collection box 560. In some embodiments, the drainage subsystem 550 includes a valve 570 (e.g., a ball valve) at the bottom of each solids collection box 560. In some embodiments, the valve 570 is operable (e.g., selectively by an operator) to drain the corresponding water tank 310 (including settled solids and/or water) through a pipe 580. In some embodiments, each pipe 580 drains to the exterior of the system 100 (e.g., outside the shipping container). In some embodiments, shrimp can be harvested by using a harvesting net on the output of each pipe 580.

In some embodiments, an exemplary system 100 includes a waste collection subsystem that is configured to collect solid material (e.g., waste) that sinks to the bottom of the tanks 310 when water is stationary, and which is caused to circulate by the exemplary water movement subsystem 500 or 550 described above. FIG. 6A shows a first exemplary waste collection subsystem 600. In some embodiments, the exemplary waste collection subsystem 600 includes waste collectors 610 positioned within each tank. In some embodiments, the waste collectors 610 include a filter configured to remove waste from water passing therethrough. In some embodiments, the filters are interchangeable. In some embodiments, the waste collection subsystem 600 also includes a solids pump 620 configured to remove waste from the waste collectors 610. In some embodiments, the waste collection subsystem 600 includes a single solids pump 620 that is configured to remove waste from all of the waste collectors 610; in other embodiments, the waste collection subsystem 600 includes a separate solids pump 620 for each of the waste collectors 610. In some embodiments, waste that is being removed from the tanks by the waste collection subsystem 600 can be sampled. In some embodiments, the contents of sampled waste can provide insights into the health of the shrimp, effectiveness of the feeding strategy, shredding, etc. In some embodiments, the waste collection subsystem 600 can also be used to extract biofloc from the tanks if necessary. In other embodiments, as will be described hereinafter, the system 100 includes a biofloc removal subsystem that is separate from the waste collection subsystem 600. In some embodiments, the waste collection subsystem 600 can also be used to empty and drain the tanks 310. In some embodiments, a harvesting system can be coupled to the waste collection subsystem to harvest shrimp from the tanks.

Figure 6B:
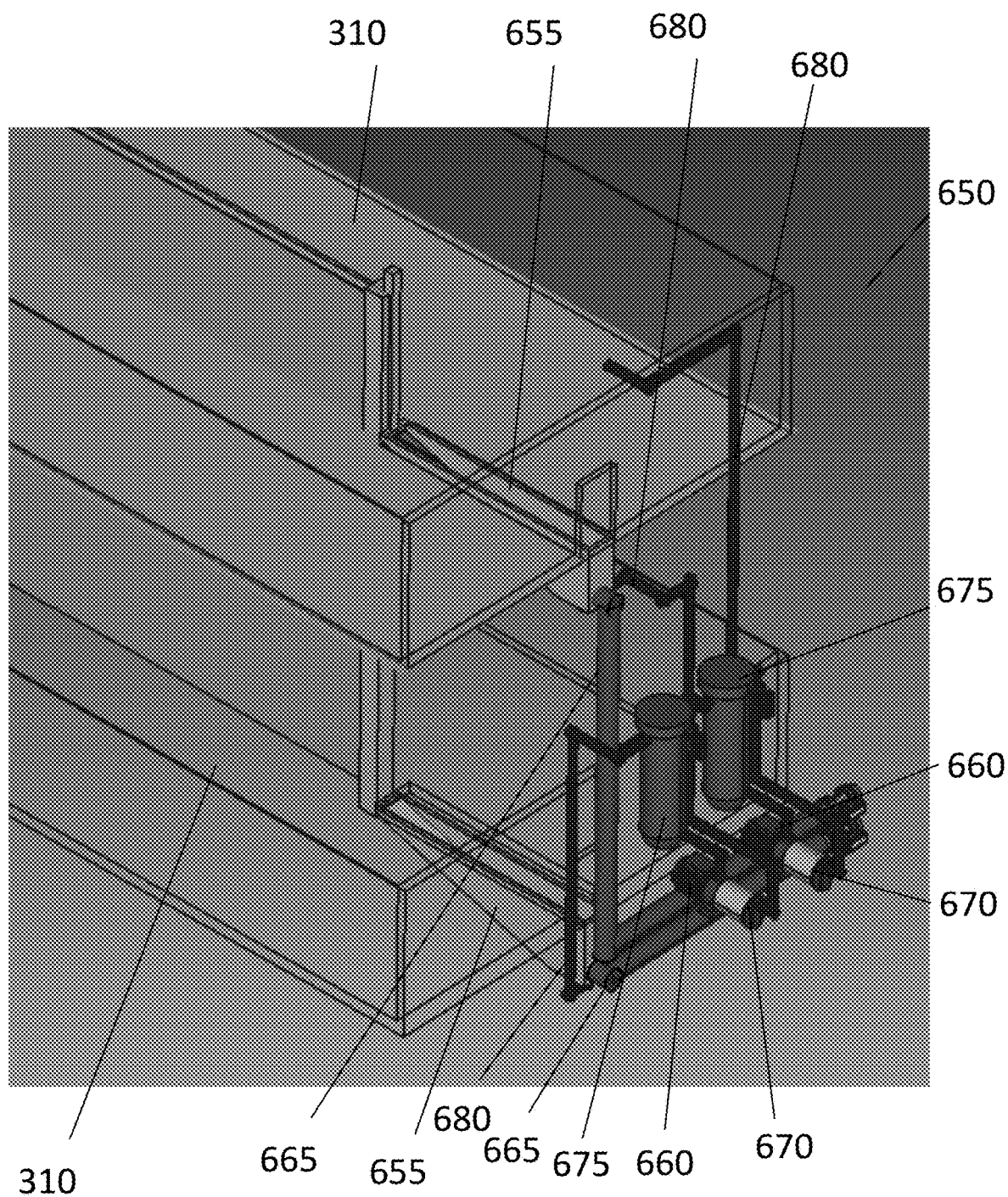
FIG. 6B shows a second exemplary waste collection subsystem.

FIG. 6B shows a second exemplary waste collection subsystem 650. In some embodiments, the waste collection subsystem 650 includes waste collectors 655 formed in the bottom of each tank 310. In some embodiments, The circular motion created by the water movement subsystem 500 allows material that sinks to the bottom of each tank 310 to be collected within the waste collectors 655. In some embodiments, the waste collectors 655 are periodically emptied of solid material by solid waste collection pumps 660 causing waste to be emptied by solid waste drainage tubes 665. In some embodiments, the waste collection subsystem 650 includes water waste pumps 670 that pump water to filters 675 with exchangeable screens that can be opened to sample the material at the bottom of the tanks 310 which can give insights into the health of the organisms, effectiveness of the feeding strategy, shredding, etc. In some embodiments, each tank 310 has its own solid waste collection pump 660 and its own water waste pump 670. In some embodiments, water is removed from each waste collector 655, pumped through the filters 675 by the pumps 670, and returned to the tanks via water tubes 680. In some embodiments, waste is removed via waste tubes. In some embodiments, the pumps 660 are activated at programmable intervals throughout the day. In some embodiments, the filter is emptied once a day by an operator to sample the amount and quality of the waste matter (e.g. number of dead, weight, etc.).

In some embodiments, the exemplary system includes a water quality monitoring subsystem. In some embodiments, the water quality monitoring subsystem 700 includes a sensor unit positioned within each tank. FIG. 7A illustrates an exemplary sensor unit 710. In some embodiments, the exemplary sensor unit 710 includes sensors operable to detect water parameters such as temperature, dissolved oxygen concentration, nitrogen concentration, phosphate concentration, pH, salinity, etc. In some embodiments, the exemplary sensor unit 710 includes a communication interface capable of transmitting, and configured to transmit, data detected thereby to the controller 210, thereby to enable the controller 210 to initiate appropriate interventions.

FIG. 7B shows another exemplary water quality monitoring subsystem. In some embodiments, the water quality monitoring subsystem 700 includes a sampling element 720 positioned in each water tank 310. In some embodiments, each sampling element 720 is configured to sample water within the corresponding water tank 310 and provide the sampled water to an analysis element 730 positioned outside the water tanks 310. In some embodiments, the analysis element 730 includes sensors operable to detect water parameters such as temperature, dissolved oxygen concentration, nitrogen concentration, phosphate concentration, pH, salinity, etc. In some embodiments, the analysis element 730 includes a communication interface capable of transmitting, and configured to transmit, data detected thereby to the controller 210, thereby to enable the controller 210 to initiate appropriate interventions.

Figure 8A:
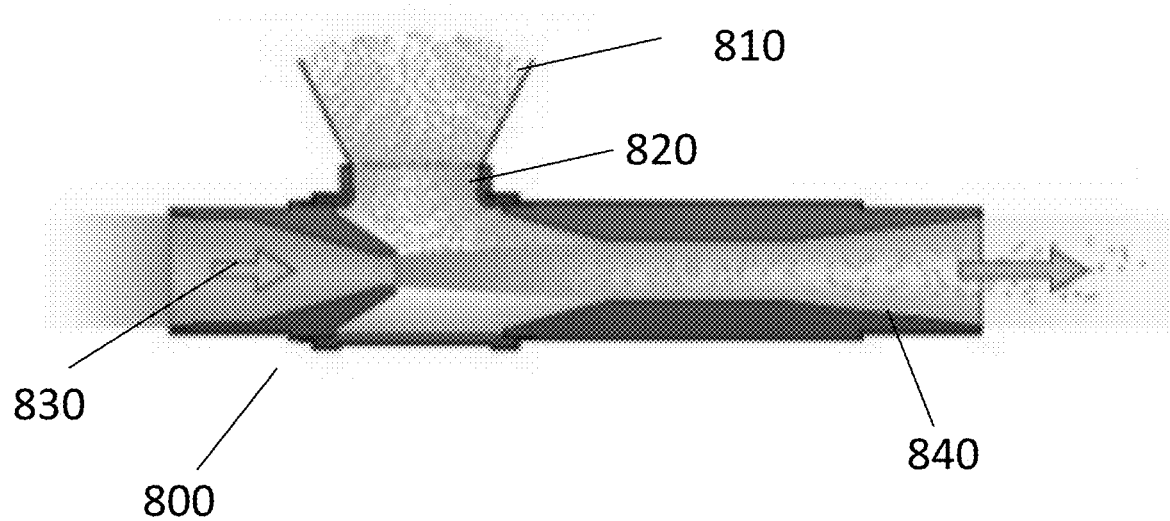
FIG. 8A shows an exemplary feeding subsystem.
Figure 8B:
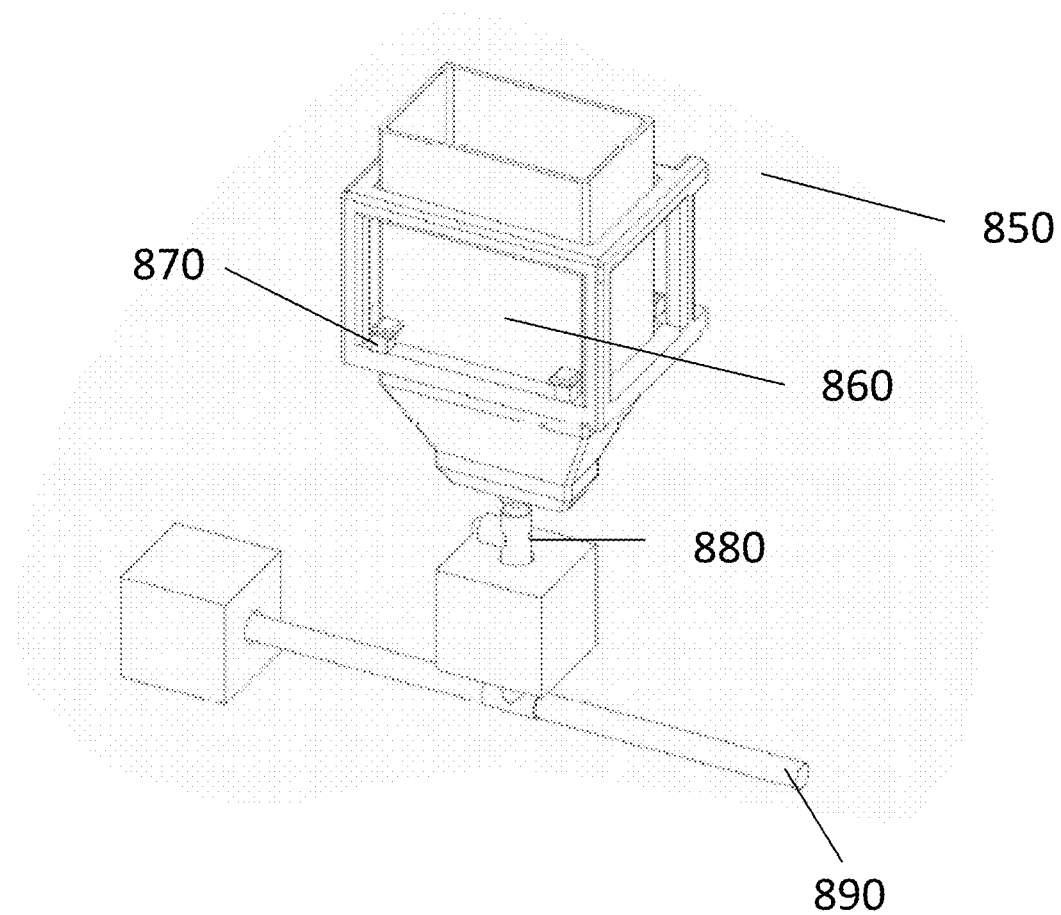
FIG. 8B shows an exemplary feeding subsystem.

In some embodiments, the exemplary system includes a feeding subsystem. FIG. 8A shows an exemplary feeding subsystem 800. In some embodiments, the exemplary feeding subsystem 800 includes a container 810 for feed that is positioned atop a weight sensor 820, thereby enabling precise amounts of food to be dispensed. In some embodiments, the container 810 is opened and closed by a motorized ball valve 830, as described above, thereby enabling the container 810 to be opened and closed by the main controller of the exemplary system. In some embodiments, the container 810 is positioned above the outlet of the regenerative blower 410 or 460 of the main aeration subsystem 400 or 450. In some embodiments, the container 810 is positioned such that the pressurized air output by the regenerative blower forces the feed into a venturi eductor 840 and subsequently into the tank. In some embodiments, as a result of use of a venturi eductor 840, feed is encouraged to fall into the feeding tube. In some embodiments, the feeding subsystem 800 is configured such that the main controller 210 can open the intake from the regenerative blower 410 or 460 at desired intervals to thereby propel feed into the tanks. In some embodiments, the feeding subsystem 800 is configured to selectively feed either the top tank 310 or the bottom tank 310. In some embodiments, the exemplary system includes two exemplary feeding subsystems 800, a first one of which is configured to feed the top tank 310 and a second one of which is configured to feed the bottom tank 310. In some embodiments, the regenerative blower and the feed container 810 are positioned within the control room 120. In some embodiments, the feeding subsystem 800 can also be used to dispense other substances (e.g., probiotics, sugars, etc.) that are in powder or particulate form. In some embodiments, the feeding subsystem 800 includes a main feeder to dispense food as described above, and a smaller version of the main feeder to dispense other substances. FIG. 8B shows an exemplary feeding subsystem 850 including a container 860, a weight sensor 870, a motorized valve 880, and a feeding tube 890 as described above.

In some embodiments, a feeding strategy (e.g., frequency of feeding and feeding amount) is determined by the system control software in accordance with production protocols. In some embodiments, production algorithms determine an appropriate amount of food to dispense, taking into account the average size of organisms, quantity of organisms, growing stage, shedding stage, feed leftovers, etc. In some embodiments, the daily amount of food and frequency of feed (e.g., times per day) are determined by an algorithm operating on a remote server and are sent to a controller operating locally at the exemplary system to execute the feeding schedule. In some embodiments, the control software is programmed to instruct the water movement subsystem to allow the water in the tanks to be still for a set period after feed is dispensed to allow the shrimp to feed. In some embodiments, the period that elapses between the dispensing of the feed and the start of the circular water movement varies depending on factors such as the growing stage, amount of feed, etc. In some embodiments, following this period, the control software is programmed to instruct the water movement subsystem to activate the water jets thereof to cause water within the tanks to circulate, thereby allowing solid matter at the bottom of the tanks to be collected. In some embodiments, by collecting solid matter at a set interval following collection, the control software is able to become informed of the feeding leftovers after such a set interval, and to improve the feeding strategy on this basis.

Figure 9:
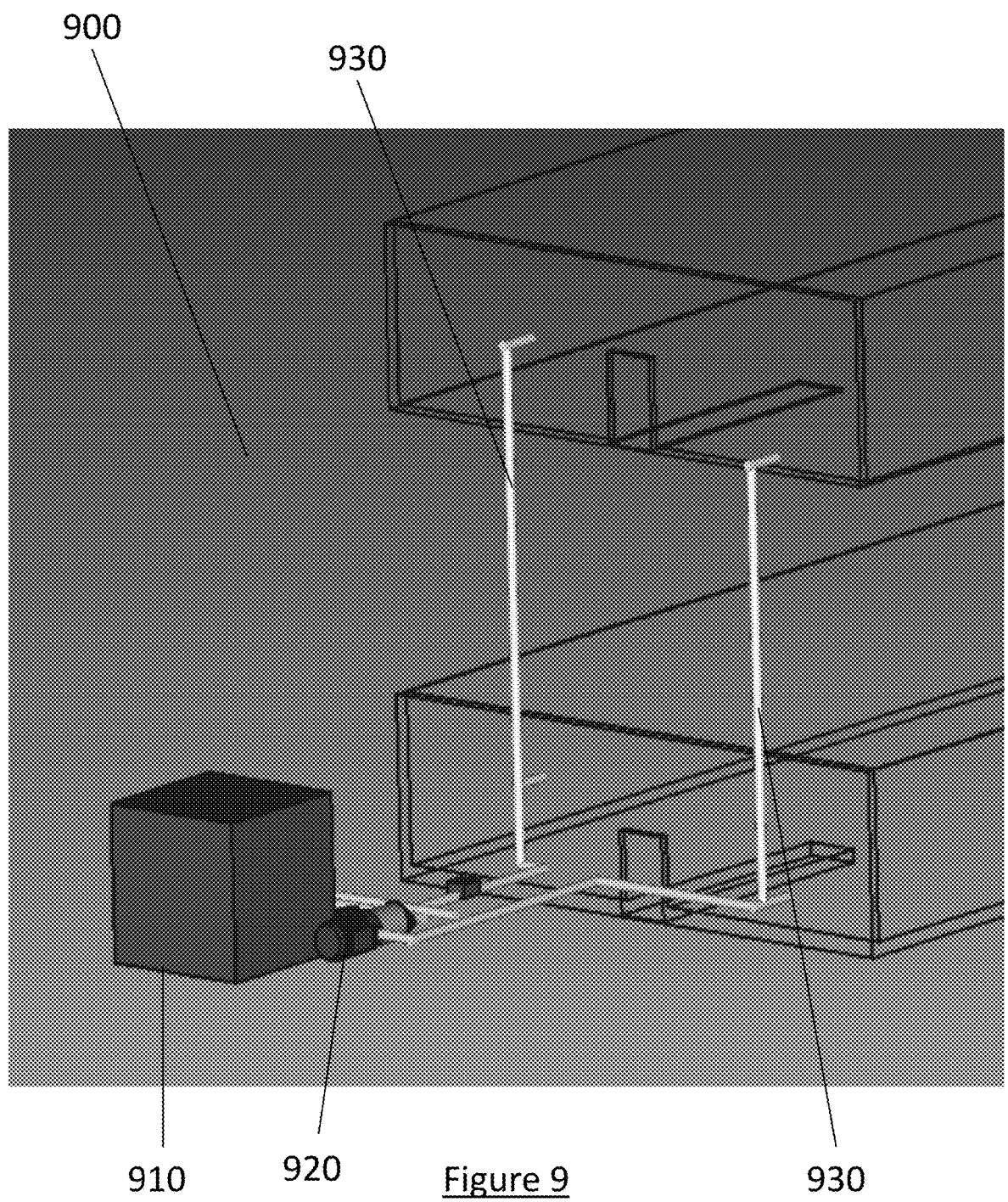
FIG. 9 shows an exemplary temperature control subsystem.

In some embodiments, the exemplary system includes a temperature control subsystem that is configured to maintain the water within the tanks at a suitable temperature. FIG. 9 illustrates an exemplary temperature control subsystem 900.

In some embodiments, a suitable temperature is a temperature in a range of between 28° C. and 33° C. In some embodiments, the temperature control subsystem 900 includes a heat exchanger 910. In some embodiments, the heat exchanger 910 is positioned so that water caused to circulate around the tank by the water movement subsystem passes through the heat exchanger and back to the tanks. In some embodiments, such as illustrated in FIG. 9, the temperature control subsystem 900 includes a pump 920 that is operative to pump water out of each tank, via tubing 930, through the heat exchanger 910, and back to each tank. In some embodiments, the pump 920 is a centrifugal pump. In some embodiments, the pump is a centrifugal pump 920 having a power of between 0.5 horsepower and 2 horsepower. In some embodiments, the pump 920 is a 1 horsepower centrifugal pump. In some embodiments, the heat exchanger 910 is controlled by the main controller of the exemplary system. In some embodiments, the main controller is operable to allow the suitable temperature to be configured.

In some embodiments, the exemplary system includes a biofloc removal subsystem. In some embodiments, it is appropriate to ensure an adequate level of biofloc within the water tanks (e.g., to avoid the water tanks containing too much biofloc) because, while the organisms within the biofloc perform important functions as discussed above, the organisms also consume oxygen that is also needed by the shrimp or other organisms being raised within the water tanks.

Figure 10A:
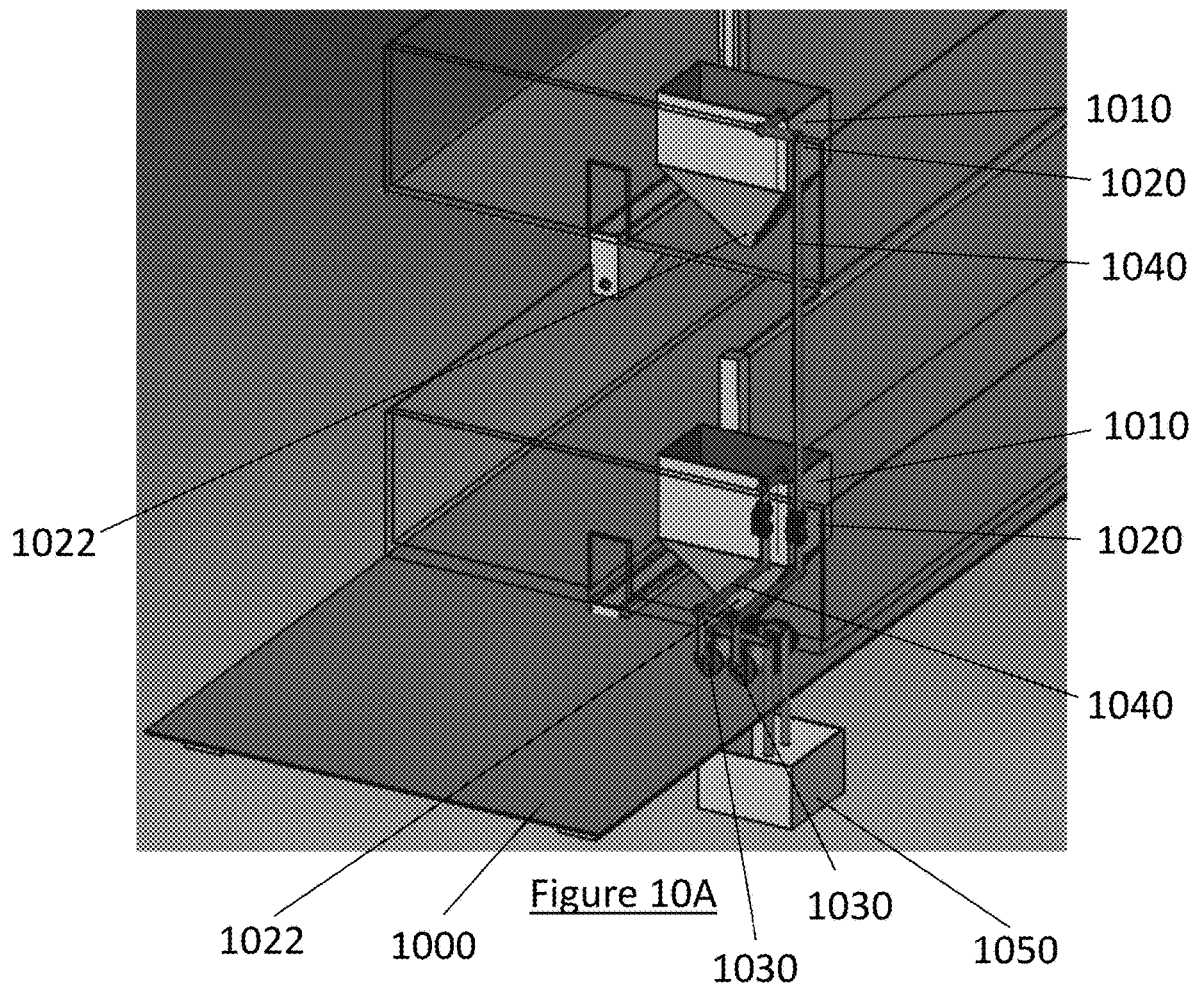
FIG. 10A shows an exemplary biofloc removal subsystem.
Figure 10B:
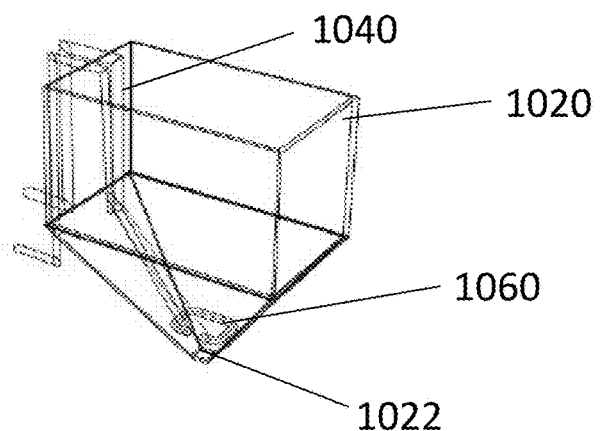
FIG. 10B shows an exemplary decanter of an exemplary biofloc removal subsystem.

FIG. 10A illustrates an exemplary biofloc removal subsystem 1000. In some embodiments, the exemplary biofloc removal subsystem includes two biofloc removal devices 1010, one for each water tank. In some embodiments, each biofloc removal device 1010 includes a decanter 1020 (e.g., an open-topped container configured to hold water) positioned within the corresponding water tank 310 such that the top of the decenter 1020 is above the water level of the corresponding water tank 310. FIG. 10B illustrates a perspective view of an exemplary decanter 1020. In some embodiments, each decanter 1020 is chute-shaped and has a tapered bottom 1022. In some embodiments, each biofloc removal device 1010 includes a water pump that is configured to remove water from the corresponding water tank 310 and pump the water into the top of the corresponding decanter 1020. In some embodiments, the water pump is a submersible pump positioned within the corresponding water tank 310. In some embodiments, as the decanter 1020 is positioned within the water tank 310, any excess water positioned within the decanter 1020 overflows the decanter and returns to the water tank 310. In some embodiments, water within the decanter 1020 is stationary and, as a result, biofloc within the decanter 1020 settles to the bottom 1022 of the decanter 1020. In some embodiments, each biofloc removal device 1010 includes a drain pump 1030 that is operable to remove biofloc from the tapered bottom 1022 of the corresponding decanter 1020 via drain piping 1040. In some embodiments, the drain pump 1030 is configured to turn on and off at periodic intervals. In some embodiments, the drain pump 1030 is configured to turn on and off based on the amount of biofloc within the decanter 1020 or within the water tank. In some embodiments, biofloc removed via the drain piping 1040 flows to a container 1050. In some embodiments, each decanter 1020 includes a biofloc aeration arrangement including an aeration tube 1060 that is connected to the main aeration system discussed above, and is separated from the bottom of the decanter 1020 by a valve (e.g., an electric ball valve) In some embodiments, when the system controller determines that enough biofloc has been removed, the valve is opened to allow air from the aeration subsystem 400 or 450 to flow into the bottom of the decanter 1020 via the aeration tube 1060. In some embodiments, when air flows in this manner, the solids at the bottom of the decanter 1020 (e.g., biofloc) mix with the water within the decanter 1020 and spill over the edge of the decanter 1020 and back into the water tank 310 in the same manner as described above for excess water. In some embodiments, removal of biofloc from the decanter 1020 in this manner prevents decomposition of biofloc within the decanter 1020, which would be detrimental to the function of the system 100 (e.g., presence of decomposing matter would be detrimental to the health of organisms within the water tanks 310).

The exemplary embodiments described above produce shrimp of excellent quality in a sustainable manner and with minimal environmental impact through the use of biofloc together with optimizations in system processes such as feeding, aeration, heating, etc. The exemplary embodiments also enable production in a smaller amount of space than existing techniques. The exemplary embodiments also provide a modular system that can be replicated and scaled, and can be deployed in different areas to produce shrimp locally to customers.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described herein, various embodiments of the invention may be readily combined, without departing from the scope or spirit of the invention.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

While a number of embodiments of the present invention have been described, it is understood that these embodiments are illustrative only, and not restrictive, and that many modifications may become apparent to those of ordinary skill in the art. For example, any dimensions discussed herein are provided as examples only, and are intended to be illustrative and not restrictive.

What is claimed is:

1. A system, comprising:
   a housing, wherein the housing is an intermodal container;
   at least one water tank positioned within the housing,
      wherein an inside of each of the at least one water tank is sealed so as to prevent contact between a material forming the at least one water tank and water within the at least one water tank;
   a water movement subsystem operable to cause water to circulate within the at least one water tank, wherein the water movement system comprises:
      at least one baffle extending longitudinally along a portion of a center of the at least one water tank so as to divide the at least one water tank into a generally circular raceway; and
      at least one pump configured to cause water to circulate about the at least one baffle;
   an aeration subsystem configured to maintain an oxygenation level within the at least one water tank,
      wherein the oxygenation level is suitable for crustaceans to live within water in the at least one water tank;
   a temperature control subsystem operable to maintain a water temperature within the at least one water tank,
      wherein the water temperature is suitable for crustaceans to live within water in the at least one water tank;
   a water quality monitoring subsystem configured to monitor at least one water quality parameter of water within the at least one water tank,
      wherein the at least one water quality parameter includes a temperature, a dissolved oxygen concentration, a nitrogen concentration, a phosphate concentration, a pH, and a salinity;
   a feeding subsystem configured to dispense food into the at least one water tank;
   a biofloc removal subsystem configured to remove biofloc from the at least one water tank, wherein the biofloc removal subsystem comprises:
      a decanter positioned within each of the at least one water tank such that excess water within the decanter overflows into the at least one water tank,
         wherein the decanter is shaped such that biofloc within water in the decanter settles to a bottom of the decanter,
      a pump configured to pump water from each of the at least one water tank and into the decanter,
      a drain pump operable to remove biofloc from the bottom of the decanter when the drain pump is activated, and
      a biofloc aeration arrangement operable to cause air to flow into the bottom of the decanter when the biofloc aeration arrangement is activated, thereby to cause biofloc to mix within water within the decanter and to overflow into the at least one water tank; and
   a computer-operated control system configured to operate the water movement system, the aeration system, the temperature control subsystem, the water quality monitoring subsystem, and the feeding subsystem.

2. The system of claim 1, wherein the aeration subsystem comprises:
   at least one main air tube extending above each of the at least one water tank, and
   a plurality of branch tubes extending away from each of the at least one main air tube into water within the at least one water tank,
   wherein each of the plurality of branch tubes includes aeration tubing.

3. The system of claim 2, wherein each of the plurality of branch tubes further includes polyvinyl chloride tubing.

4. The system of claim 3, wherein the polyvinyl chloride tubing has a diameter of ½ inch.

5. The system of claim 2, wherein the aeration tubing includes porous tubing having an average pore size that is in a range of from 0.001 inch to 0.004 inch.

6. The system of claim 2, wherein the aeration subsystem comprises a main aeration subsystem and a secondary aeration subsystem.

7. The system of claim 6, wherein the secondary aeration subsystem comprises at least one venturi eductor coupled to the water movement subsystem.

8. The system of claim 1, wherein the feeding subsystem includes:
   a scale;

a feed container positioned on the scale;

a valve positioned at a bottom of the feed container and operable to allow feed to pass therethrough when the valve is in an open position; and a feeding tube coupled to the aeration subsystem and the valve such that air provided by the aeration subsystem propels feed passing through the valve into the at least one water tank.

9. The system of claim 8, wherein the system includes one of the feeding subsystem for each of the at least one water tank.

10. The system of claim 1, wherein the at least one water tank includes a first water tank positioned at a bottom of the housing and a second water tank positioned above the first water tank.

11. The system of claim 10, further comprising a support structure configured to support weight of at least the second water tank.

12. The system of claim 1, wherein each of the at least one water tank has a volume that is in a range of from 10 cubic meters to 50 cubic meters.

13. The system of claim 1, further comprising a control room positioned at a first end of the housing.

14. The system of claim 1, wherein the system is configured to support presence of biofloc within the at least one water tank.

15. The system of claim 14, wherein the computer-operated control system is configured to support presence of biofloc within the at least one water tank by controlling a ratio of carbon to nitrogen within water within the at least one water tank.

16. The system of claim 15, wherein the computer-operated control system is configured to support presence of biofloc within the at least one water tank by controlling the ratio of carbon to nitrogen within water within the at least one water tank to be in a range of from 12:1 to 20:1.

17. The system of claim 1, wherein the biofloc aeration arrangement comprises:

a valve that is operable to activate the aeration arrangement; and an aeration tube that is coupled to the valve and to the aeration subsystem.

18. The system of claim 1, further comprising a drain subsystem operable to remove waste material from the at least one water tank.

19. The system of claim 1, wherein each of the at least one water tank is sealed by a water-resistant paint.

* * * * *